United States Patent
Yi et al.

(10) Patent No.: US 11,334,908 B2
(45) Date of Patent: May 17, 2022

(54) ADVERTISEMENT DETECTION METHOD, ADVERTISEMENT DETECTION APPARATUS, AND STORAGE MEDIUM

(71) Applicant: Tencent Technology (Shenzhen) Company Limited, Shenzhen (CN)

(72) Inventors: Hong Yi, Shenzhen (CN); Jiabin Wang, Shenzhen (CN); Yuanhai Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 405 days.

(21) Appl. No.: 16/030,749

(22) Filed: Jul. 9, 2018

(65) Prior Publication Data
US 2018/0322526 A1    Nov. 8, 2018

Related U.S. Application Data

(63) Continuation of application No. PCT/CN2017/082069, filed on Apr. 26, 2017.

(30) Foreign Application Priority Data

May 3, 2016    (CN) .......................... 201610288674.5

(51) Int. Cl.
*G06Q 30/00* (2012.01)
*G06Q 30/02* (2012.01)
*G06F 21/56* (2013.01)

(52) U.S. Cl.
CPC ......... *G06Q 30/0243* (2013.01); *G06F 21/56* (2013.01); *G06Q 30/0273* (2013.01)

(58) Field of Classification Search
None
See application file for complete search history.

(56) References Cited

U.S. PATENT DOCUMENTS

| 7,657,626 B1 * | 2/2010 | Zwicky ................. G06Q 30/02 709/224 |
| 2004/0153365 A1 * | 8/2004 | Schneider .......... G06Q 30/0217 705/14.19 |

(Continued)

FOREIGN PATENT DOCUMENTS

| CN | 101984450 A | 3/2011 |
| CN | 103226583 A | 7/2013 |

(Continued)

OTHER PUBLICATIONS

• Zee Drakhshandeh. "Basic Google Analytics Filters for Every Site." (Dec. 10, 2015). Retrieved online Feb. 15, 2022. https://www.bounteous.com/insights/2015/12/10/basic-google-analytics-filters-every-site/ (Year: 2015).*

(Continued)

*Primary Examiner* — James A Reagan
(74) *Attorney, Agent, or Firm* — Morgan, Lewis & Bockius LLP

(57) ABSTRACT

A device extracts a plurality of characteristics from a sample set. For each extracted characteristic, the device determines different types of advertisements carried in advertisement samples in the sample set matching the characteristic. The device determines characteristic values of the characteristic that correspond to the different types of advertisements. The device filters based on characteristic values of the characteristic that correspond to the different types of advertisements, the extracted plurality of characteristics to obtain respective advertisement characteristics of the different types of advertisements. The device matches the advertisement characteristics of the different types of advertisements against characteristics extracted from a to-be-detected sample, and determines whether the to-be-detected sample (Continued)

carries an advertisement, and if so, which type of advertisement.

17 Claims, 11 Drawing Sheets

(56) References Cited

U.S. PATENT DOCUMENTS

| | | | | |
|---|---|---|---|---|
| 2007/0061211 A1* | 3/2007 | Ramer | ............... | G06Q 20/322 705/25 |
| 2008/0147456 A1* | 6/2008 | Broder | ............... | G06Q 30/0248 705/14.47 |
| 2008/0162202 A1* | 7/2008 | Khanna | ............... | G06Q 30/06 705/14.47 |
| 2008/0249832 A1* | 10/2008 | Richardson | ............ | G06Q 30/02 705/14.54 |
| 2008/0270154 A1* | 10/2008 | Klots | ............... | G06Q 30/02 705/14.61 |
| 2009/0024480 A1* | 1/2009 | Dai | ............... | G06Q 30/0276 705/14.5 |
| 2009/0157417 A1* | 6/2009 | Bradley | ............... | G06Q 30/02 705/318 |
| 2009/0172030 A1* | 7/2009 | Schiff | ............... | G06Q 30/0244 707/E17.02 |
| 2009/0299967 A1* | 12/2009 | Li | ............... | G06Q 30/02 |
| 2011/0029393 A1* | 2/2011 | Apprendi | ............ | G06Q 30/0277 705/14.73 |
| 2011/0047006 A1* | 2/2011 | Attenberg | ............ | G06Q 30/0282 705/347 |
| 2011/0131652 A1* | 6/2011 | Robinson | ............ | H04L 63/1408 726/22 |
| 2012/0079596 A1* | 3/2012 | Thomas | ............... | H04L 63/1433 726/24 |
| 2012/0166276 A1* | 6/2012 | Chitnis | ............... | G06Q 30/0251 707/706 |
| 2012/0324098 A1* | 12/2012 | De Jager | ............ | G06F 11/3664 709/224 |
| 2013/0047149 A1* | 2/2013 | Xu | ............... | G06F 21/53 717/175 |
| 2013/0097706 A1* | 4/2013 | Titonis | ............... | G06F 21/56 726/24 |
| 2014/0114752 A1* | 4/2014 | Li | ............... | G06Q 30/0241 705/14.47 |
| 2014/0324892 A1* | 10/2014 | Tong | ............... | G06F 16/9535 707/754 |
| 2015/0088662 A1 | 3/2015 | Noller et al. | | |
| 2015/0326520 A1* | 11/2015 | Zhong | ............... | H04L 51/12 709/206 |
| 2016/0314491 A1* | 10/2016 | Shani | ............... | G06Q 30/0275 |
| 2016/0321452 A1* | 11/2016 | Richardson | ......... | H04W 12/1208 |
| 2017/0186030 A1* | 6/2017 | Jiang | ............... | G06N 20/00 |
| 2017/0311024 A1* | 10/2017 | Zhou | ............... | H04N 21/812 |
| 2017/0323337 A1* | 11/2017 | Yang | ............... | G06Q 30/02 |
| 2017/0351775 A1* | 12/2017 | Rui | ............... | G06F 16/9535 |

FOREIGN PATENT DOCUMENTS

| | | | | |
|---|---|---|---|---|
| CN | 105468975 A | | 4/2016 | |
| CN | 105512558 A | | 4/2016 | |
| JP | 2009171271 A | * | 7/2009 | ............ H04N 7/173 |
| JP | 2014160491 A | * | 9/2014 | ............ G06Q 10/10 |
| WO | WO-2008026441 A1 | * | 3/2008 | ............ G06Q 30/02 |

OTHER PUBLICATIONS

• Adguard. "How to create your own ad filters." (Feb. 1, 2012). Retrieved online Feb. 15, 2022.https://kb.adguard.com/en/general/how-to-create-your-own-ad-filters (Year: 2012).*
Tencent Technology, ISRWO, PCT/CN2017/082069, dated Jul. 31, 2017, 7 pgs.
Tencent Technology, IPRP, PCT/CN2017/082069, dated Nov. 6, 2018, 6 pgs.

* cited by examiner

ADVERTISEMENT DETECTION METHOD, ADVERTISEMENT DETECTION APPARATUS, AND STORAGE MEDIUM

PRIORITY CLAIMS AND RELATED APPLICATIONS

This application is a continuation application of PCT application number PCT/CN2017/082069, entitled "ADVERTISEMENT DETECTION METHOD, ADVERTISEMENT DETECTION APPARATUS, AND STORAGE MEDIUM", filed with the Chinese Patent Office on Apr. 26, 2017, which claims priority to Chinese Patent Application No. 201610288674.5, entitled "ADVERTISEMENT DETECTION METHOD, ADVERTISEMENT DETECTION APPARATUS, AND STORAGE MEDIUM" filed with the Patent Office of China on May 3, 2016, all of which are incorporated by reference in their entirety.

FIELD OF THE TECHNOLOGY

The present disclosure relates to the communications technologies, and in particular, to an advertisement detection method, an advertisement detection apparatus, and a storage medium.

BACKGROUND OF THE DISCLOSURE

A large number of application programs are usually installed on terminals such as smartphones and tablet computers.

Currently, there are various sources of application programs. Advertisements are embedded in many application programs. Some programs carrying advertisements are disguised as regular application programs (for example, various learning, entertainment, social applications) to deceive users into installing the programs. Once such an application program is clicked or installed on a terminal, advertisements frequently appear when a user uses the terminal to cause interference to the user, even information of the user is stolen, or a communications function of the terminal is invoked to perform communication (for example, make phone calls or send SMS messages) to cause increased communications expense of the user. Therefore, it is necessary to detect whether an advertisement is embedded in an application program.

SUMMARY

In a current advertisement detection technology, an advertisement characteristic is manually extracted from an advertisement sample (that is, a known application program carrying an advertisement or a malicious application program that is disguised as a regular application program and carries an advertisement), and a manner of matching the advertisement characteristic against a characteristic extracted from an application is used to detect whether an application carries an advertisement.

In this manner, advertisement characteristics need to be continuously updated to detect in time an application program carrying a new advertisement. In an aspect, the efficiency of advertisement detection is affected. In another aspect, extracted advertisement characteristics are inevitably not up-to-date, resulting in low accuracy of detecting whether an application program carries a new advertisement.

Embodiments of the present disclosure provide an advertisement detection method, an advertisement detection apparatus, and a storage medium, so that advertisement characteristics can be efficiently extracted from advertisement samples to detect an advertisement, so as to improve the timeliness of performing advertisement detection according to the advertisement characteristics.

The technical solutions in the embodiments of the present disclosure are implemented as follows:

In an aspect, an advertisement detection method is performed at a device having one or more processors and memory. The device extracts a plurality of characteristics from a sample set, including extracting a respective characteristic of each advertisement sample in the sample set. For each characteristic of the extracted plurality of characteristics: the device determines different types of advertisements carried in advertisement samples in the sample set matching the characteristic. The device also determines characteristic values of the characteristic that correspond to the different types of advertisements, each of the characteristic values representing a probability that the characteristic is an advertisement characteristic of a corresponding type of advertisements. The determining includes determining, for each type of advertisements, a quantity of advertisement samples in the sample set that match the characteristic and carry the corresponding type of advertisements, and determining, based on the quantity, a characteristic value of the characteristic corresponding to the corresponding type of advertisement. The device filters, based on characteristic values of the characteristic that correspond to the different types of advertisements, the extracted plurality of characteristics to obtain respective advertisement characteristics of the different types of advertisements. The device matches the advertisement characteristics of the different types of advertisements against characteristics extracted from a to-be-detected sample. The device determines, when a match is found based on the matching, that the to-be-detected sample carries an advertisement, and carries an advertisement of a type corresponding to a matching advertisement characteristic.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

In the embodiments of the present disclosure, characteristics are automatically extracted (including an advertisement characteristic and a non-advertisement characteristic) and the characteristics are further filtered based on characteristic values of the characteristics to obtain an advertisement characteristic. The entire process does not involve the processing of manually extracting an advertisement characteristic. In this way, after an advertisement sample having a new advertisement is added to a sample set, an advertisement characteristic corresponding to the new advertisement can be automatically determined, so as to achieve a technical effect that advertisement characteristics can be efficiently updated, so that a to-be-detected sample including a new advertisement can be accurately detected based on automatic and rapid update of advertisement characteristics.

BRIEF DESCRIPTION OF THE DRAWINGS

FIG. 2-1 is another optional schematic flowchart of an advertisement detection method according to an embodiment of the present disclosure;

FIG. 2-2 is still another optional schematic flowchart of an advertisement detection method according to an embodiment of the present disclosure;

FIG. 3-1 is an optional schematic processing diagram of determining a characteristic value in an advertisement detection method according to an embodiment of the present disclosure;

FIG. 3-2 is another optional schematic processing diagram of determining a characteristic value in an advertisement detection method according to an embodiment of the present disclosure;

FIG. 4-1 is an optional schematic processing diagram of determining a characteristic value in an advertisement detection method according to an embodiment of the present disclosure;

FIG. 4-2 is another optional schematic processing diagram of determining a characteristic value in an advertisement detection method according to an embodiment of the present disclosure;

FIG. 5-1 is an optional schematic processing diagram of determining a characteristic value in an advertisement detection method according to an embodiment of the present disclosure;

FIG. 5-2 is another optional schematic processing diagram of determining a characteristic value in an advertisement detection method according to an embodiment of the present disclosure;

DESCRIPTION OF EMBODIMENTS

Figure 1:
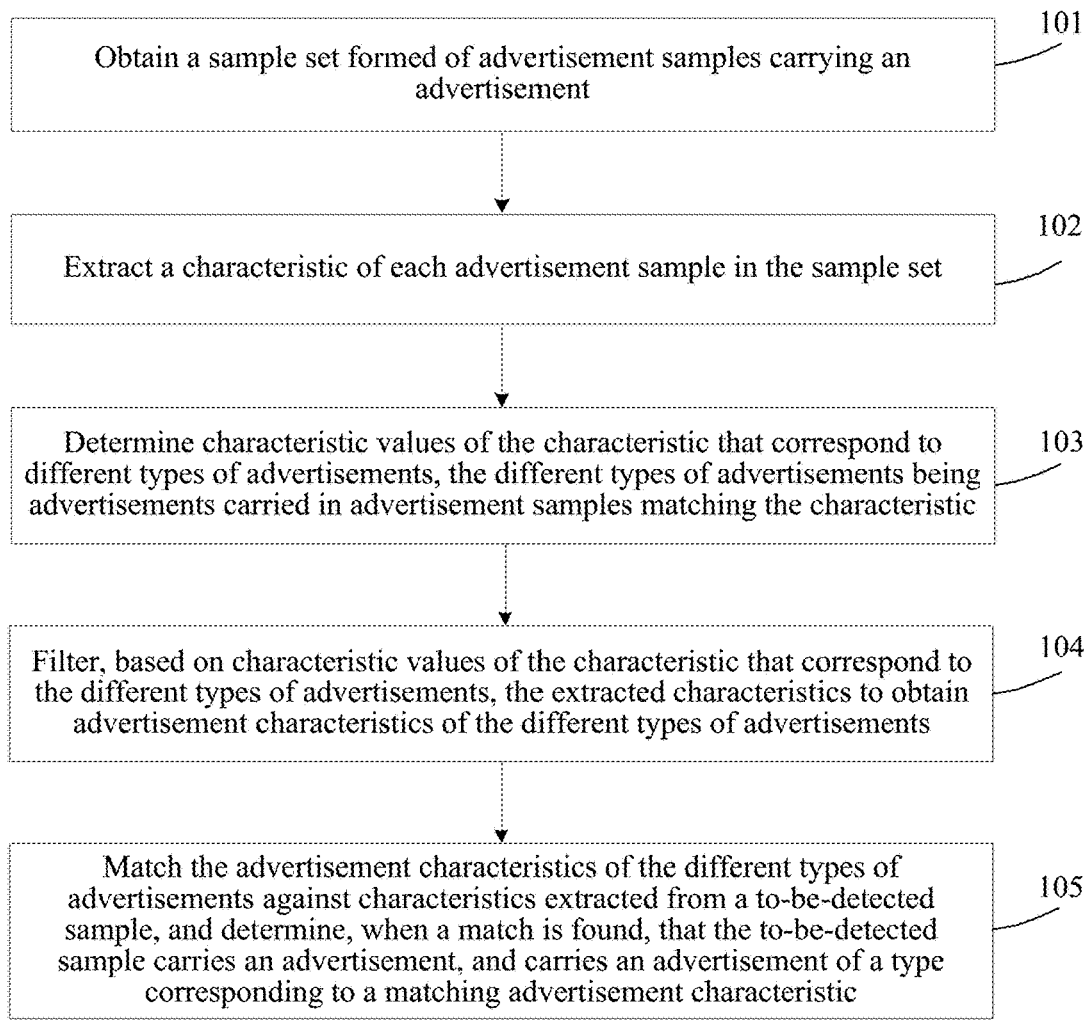
FIG. 1 is an optional schematic flowchart of an advertisement detection method according to an embodiment of the present disclosure.

The following further describes the present disclosure in detail with reference to the accompanying drawings and embodiments. It should be understood that the embodiments provided herein are merely used to explain the present disclosure but are not intended to limit the present disclosure. In addition, the embodiments provided in the following are some embodiments used to implement the present disclosure, but are not all embodiments used to implement the present disclosure. The technical solutions recorded in the embodiments of the present disclosure may be randomly combined with each other provided that there is no conflict.

Before the embodiments of the present disclosure are further described in detail, the nouns and terms used in the embodiments of the present disclosure are described. The nouns and terms used in the embodiments of the present disclosure are applicable to the following explanation.

1) An advertisement is media information in the form such as a picture, a video, audio, and a text for promoting a product or a service.

2) An advertisement sample is: 2.1) an advertisement, that is, an advertisement itself; or 2.2) an application program carrying an advertisement or an advertisement playing processing logic (for example, a logic of obtaining an advertisement from an external website and playing the advertisement under a specific condition). For example, the application program is an application program such as a social application program and a video application, or a service program of a type such as a power management program and a hard disk management program, or a malicious program that carries an advertisement and is disguised as a regular application program.

3) An application program is software developed for an application objective of a user, and is provided in the form of an installation package or provided in the form of an executable program or various forms of intermediate code (which may further include a necessary library file). The embodiments of the present disclosure do not exclude the use of any form of application program.

4) A to-be-detected sample is a sample of an application program for which detection needs to be performed to find whether an advertisement is carried, and is, for example, an installation package of an application program, or an executable program encapsulated with a library file.

In an advertisement detection technology provided in the related technology, an advertisement characteristic is always manually extracted from a known advertisement sample carrying an advertisement. For example, a character string or a code segment of a corresponding advertisement in an advertisement sample is used as an advertisement characteristic. The advertisement characteristic is matched against characteristics extracted from a to-be-detected sample. If a match is found, it is determined that the to-be-detected sample carries an advertisement.

Such a manner of detecting an advertisement at least has the following problems: A developer may make simple modifications to a characteristic of an advertisement carried in an application program to evade the detection of an advertisement in the application program. In such a case, if an advertisement having a modified characteristic needs to be detected, a new advertisement characteristic inevitably needs to be manually extracted from a new advertisement sample to detect an advertisement.

Each update of advertisement characteristics involves an operation of manually extracting an advertisement characteristic. For manual extraction of an advertisement characteristic, in one aspect, the efficiency of advertisement detection is affected by low extraction efficiency, and in another aspect, advertisement detection is not up-to-date, and a new advertisement or an advertisement with a modified advertisement characteristic cannot be detected in time.

For the foregoing problem, in the embodiments of the present disclosure, a characteristic of each advertisement sample in a set (referred to as a sample set hereinafter) of advertisement samples carrying an advertisement is automatically extracted. An extracted characteristic is: 1) an advertisement characteristic of an advertisement carried in an advertisement sample; or 2) a characteristic of a program in the advertisement samples. In view of such a case, characteristics are extracted from an advertisement sample, and a characteristic value of each characteristic is determined, where the characteristic value is used to represent a probability that the advertisement sample having the characteristic carries advertisement. Extracted characteristics are filtered based on characteristic values, to obtain characteristics, that is, advertisement characteristics, of different types of advertisements carried in advertisement samples in the sample set. The advertisement characteristics of the different types of advertisements are matched against characteristics of a to-be-detected sample. If a match is found, it is determined that the to-be-detected sample carries a corresponding type of advertisement.

Therefore, characteristics are automatically extracted (including an advertisement characteristic and a non-advertisement characteristic), and the characteristics are further filtered based on characteristic values of the characteristics for the different types of advertisements to obtain an advertisement characteristic. The entire process does not involve the processing of manually extracting an advertisement characteristic. After an advertisement sample having a new advertisement is added to a sample set, an advertisement characteristic corresponding to the new advertisement can be automatically determined, so as to achieve a technical effect that advertisement characteristics can be efficiently updated, so that a to-be-detected sample carrying a new advertisement can be accurately detected based on automatic and rapid update of advertisement characteristics.

Referring to FIG. 1, FIG. 1 is an optional schematic flowchart of an advertisement detection method according to an embodiment of the present disclosure, including step 101 to step 105. The steps are described in the following.

Step 101: Obtain a sample set formed of advertisement samples each carrying an advertisement.

In an implementation, advertisement samples in the sample set may be periodically collected from a developer side or a user side. For example, a developer may determine whether an unknown sample carries an advertisement and determine the type of the carried advertisement, to obtain an advertisement sample. Alternatively, a user of a terminal submits feedback information (for example, information about whether the sample carries an advertisement and information about the type of the advertisement) for a sample, to obtain an advertisement sample.

Specific examples are used for description. It is assumed that a sample set includes an advertisement sample 1 and an advertisement sample 2. The advertisement sample 1 and the advertisement sample 2 are application programs that carry an advertisement and are determined by a developer through manual analysis. The advertisement sample 1 carries two different types of advertisements, that is, an advertisement 1 and an advertisement 2. The advertisement sample 2 carries one type of advertisement, that is, the advertisement 1. An advertisement sample 3 carries one type of advertisement, that is, an advertisement 3. The advertisement sample 1 is marked as <Advertisement sample 1, advertisement 1, advertisement 2>. The advertisement sample 2 is marked as <Advertisement sample 2, advertisement 1>. The advertisement sample 3 is marked as <Advertisement sample 3, advertisement 3>. As shown in the following Table 1:

TABLE 1

| Advertisement sample 1 | <Advertisement sample 1, advertisement 1, advertisement 2> |
|---|---|
| Advertisement sample 2 | <Advertisement sample 2, advertisement 1> |
| Advertisement sample 3 | <Advertisement sample 3, advertisement 3> |

Step 102: Extract a characteristic of each advertisement sample in the sample set.

In an implementation, code of each advertisement sample in the sample set is parsed, to obtain a characteristic of each function in the code in the dimension of binary code sequences. Certainly, characteristics of an advertisement sample may further be extracted in other manners. For example, code of an advertisement sample is statically analyzed to extract a function stream for use as a characteristic of the advertisement sample. This embodiment of the present disclosure does not exclude the use of other manners to extract characteristics from an advertisement sample.

For another example, an advertisement sample is an application program carrying an advertisement on an Android platform. An installation package of an application program whose format is an Android package is unpacked to obtain a Dalvik Executable (Dex) file (that is, an executable program). The Dex file is parsed in the dimension of a function. For example, all functions of the Dex file are parsed, and a characteristic of an opcode of each function is extracted. An opcode is a part of a computer instruction (binary code) and is configured as an operation that is specified to be executed. An operation to be executed that is indicated by an advertisement opcode is distinctly different from an operation indicated by an opcode of an application itself. An advertisement and an application program can be effectively distinguished according to characteristics in the dimension of opcodes.

The advertisement samples shown in Table 1 continue to be described by using specific examples shown in Table 2.

TABLE 2

| Characteristic 1 | Advertisement sample 1 | <Advertisement sample 1, advertisement 1, advertisement 2> |
|---|---|---|
| Characteristic 1 | Advertisement sample 2 | <Advertisement sample 2, advertisement 1> |
| Characteristic 2 | Advertisement sample 3 | <Advertisement sample 3, advertisement 3> |

As shown in Table 2, it is assumed that the characteristic 1 is extracted from the advertisement sample 1. In this case, the characteristic 1 is: 1) a characteristic (that is, an advertisement characteristic) of the advertisement 1 or the advertisement 2 or a common characteristic of the advertisement 1 and the advertisement 2; or 2) the characteristic 1 is a characteristic of an application program in the advertisement sample 1 (that is, in this case, the characteristic 1 is not an advertisement characteristic).

It is further assumed that the characteristic 1 is also extracted from the advertisement sample 2. In this case, the characteristic 1 is: 1) a characteristic (that is, the characteristic 1 is an advertisement characteristic) of the advertisement 1; or 2) a characteristic of an application program in the advertisement sample 2 (in this case, the characteristic 2 is not advertisement characteristic).

It is further assumed that the characteristic 2 is extracted from the advertisement sample 3. In this case, the characteristic 2 is: 1) a characteristic (that is, a characteristic 3 is an advertisement characteristic) of the advertisement 3; or 2) a characteristic of an application program in the advertisement sample 2 (in this case, the characteristic 3 is not an advertisement characteristic).

How to filter the characteristic 1 and the characteristic 2 to obtain characteristics, that is, advertisement characteristics, of the advertisement 1 to the advertisement 3 is described below with reference to the subsequent steps.

Step 103: Determine characteristic values of the characteristic that correspond to different types of advertisements, the different types of advertisements being advertisements carried in advertisement samples matching the characteristic.

An advertisement sample matching a characteristic is an advertisement sample carrying the characteristic. By matching a characteristic against characteristics of advertisement samples in a sample set, an advertisement sample matching the characteristic can be determined. Characteristic values of a characteristic correspond to different types of advertisements one by one. For one characteristic, if a matching advertisement sample carries a plurality of types of advertisements, the characteristic has a corresponding characteristic value for each type of advertisement.

For example, for the characteristic 1, advertisement samples matching the characteristic 1 include the advertisement sample 1 and the advertisement sample 2. The advertisement sample 1 carries two different types of advertisements, that is, the advertisement 1 and the advertisement 2. The advertisement sample 2 carries the advertisement 1. In this case, the characteristic 1 has a characteristic value for the advertisement 1 and a characteristic value for the advertisement 2.

For an advertisement sample matching one characteristic, the characteristic is: 1) a characteristic of an application program in the matching advertisement sample; or 2) a characteristic of one advertisement or a common characteristic of a plurality of advertisements in the matching advertisement sample.

The characteristic 1 is still used as an example. For the advertisement sample 1 matching the characteristic 1, a characteristic 1 may be an advertisement characteristic of at least one of the advertisement 1 and the advertisement 2 or a characteristic of an application program in the advertisement sample 1.

Different cases are described in the following.

1) An advertisement sample matching a characteristic carries only one type of advertisement. The characteristic satisfies one of the following cases and satisfies only one case:

a) The characteristic is a characteristic of the only type of advertisement carried in the advertisement sample, or is a common characteristic of a plurality of types of advertisements carried in the advertisement sample, that is, the characteristic can match at least one type of advertisement.

b) The characteristic is a characteristic of an application itself in the advertisement sample, that is, the characteristic cannot match an advertisement carried in the advertisement sample.

2) An advertisement sample matching a characteristic includes two or more types of advertisements. The characteristic satisfies one of the following cases:

a) The characteristic is a characteristic of some advertisements (at least two advertisements) carried in the advertisement sample, that is, the characteristic can match at least some advertisements in the advertisement sample (the advertisement sample matching a characteristic is an advertisement sample having the characteristic).

b) The characteristic is a common characteristic of all the advertisements carried in the advertisement sample. That is, the characteristic can match all the advertisements in the advertisement sample (the advertisement sample matching a characteristic is an advertisement sample having the characteristic).

c) The characteristic is a characteristic of an application program in the advertisement sample, that is, the characteristic cannot match any advertisement in the advertisement sample (the advertisement sample matching a characteristic is an advertisement sample having the characteristic).

In this embodiment of the present disclosure, for each characteristic, characteristic values of the characteristic that correspond to the different types of advertisements are established. A characteristic value represents a probability that the characteristic is a corresponding type of advertisement carried in the advertisement sample (the advertisement sample matching the characteristic).

The calculation of a characteristic value continues to be described with reference to the example.

As discussed above, the characteristic 1 matches the advertisement sample 1 and the advertisement sample 2. In this case, the advertisement samples matching the characteristic 1 carry two different types of advertisements, that is, the advertisement 1 and the advertisement 2. A characteristic value of the characteristic 1 corresponding to the advertisement 1 represents a probability that the characteristic 1 is an advertisement characteristic of the advertisement 1. A characteristic value of the characteristic 1 corresponding to the advertisement 2 represents a probability that the characteristic 1 is an advertisement characteristic of the advertisement 2. As shown in the following Table 3:

TABLE 3

| The characteristic value of the characteristic 1 corresponding to the advertisement 1 | The probability that the characteristic 1 is an advertisement characteristic of the advertisement 1 |
|---|---|
| The characteristic value of the characteristic 1 corresponding to the advertisement 2 | The probability that the characteristic 1 is the advertisement characteristic of the advertisement 2 |

The advertisement sample matching the characteristic 2 carries the advertisement 3. The characteristic value of the characteristic 2 corresponding to the advertisement 3 represents a probability that the characteristic 2 is an advertisement characteristic of the advertisement 3. As shown in the following Table 4:

TABLE 4

| The characteristic value of the characteristic 2 corresponding to the advertisement 3 | The probability that the characteristic 2 is an advertisement characteristic of the advertisement 3 |
| --- | --- |

A plurality of different manners of determining a characteristic value of a characteristic are described in the following respectively.

Manner 1) of Determining a Characteristic Value of a Characteristic

Figures 1, 2:
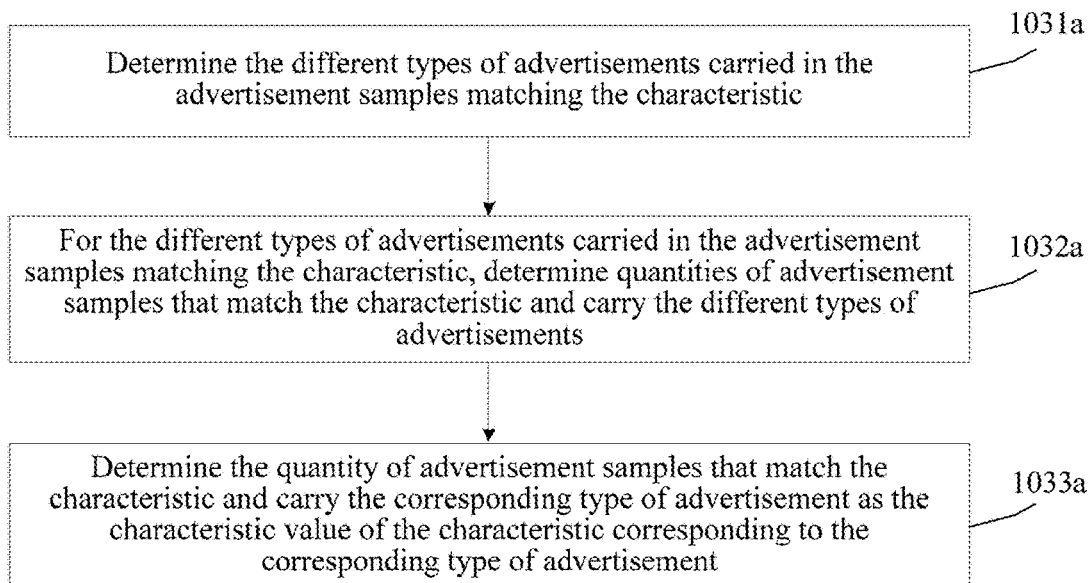
Figure 2:
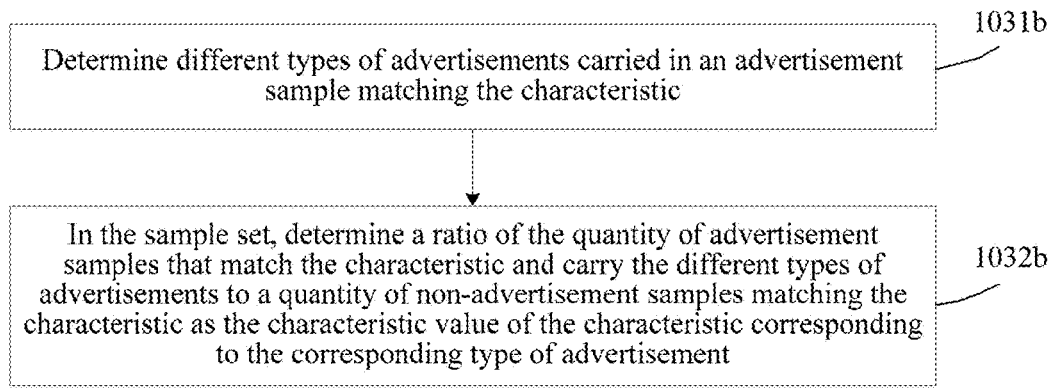

In one implementation of determining a characteristic value of a characteristic, characteristic values corresponding to different types of advertisements are determined for each extracted characteristic. Referring to FIG. 2-1, FIG. 2-1 is an optional schematic flowchart of determining a characteristic value of a characteristic, including step 1031a to step 1033a. The steps are described in the following.

Step 1031a: Determine the different types of advertisements carried in the advertisement samples matching the characteristic.

A characteristic extracted from one advertisement sample may match other advertisement samples in the sample set. In the example, the characteristic 1 extracted from the advertisement sample 1 further matches the advertisement sample 2 in the sample set. Therefore, the advertisement samples matching the characteristic 1 are the advertisement sample 1 and the advertisement sample 2. Correspondingly, it is determined that the advertisement samples (the advertisement sample 1 and the advertisement sample 2) matching the characteristic 1 carry two different types of advertisements, that is, the advertisement 1 and the advertisement 2.

The description is continued with reference to the example. The characteristic 2 extracted from the advertisement sample 3 only matches the advertisement sample 3 in the sample set. Therefore, the advertisement sample matching the characteristic 3 is the advertisement sample 3. The advertisement sample matching the characteristic 3 carries only one type of advertisement, that is, the advertisement 3. For the advertisement samples matching the characteristic 1 and the characteristic 2, the carried different types of advertisements are shown in Table 5.

TABLE 5

| Characteristic 1 | Advertisement 1, advertisement 2 |
| Characteristic 2 | Advertisement 1 |

Step 1032a: For the different types of advertisements carried in the advertisement samples matching the characteristic, determine quantities of advertisement samples that match the characteristic and carry the different types of advertisements.

If one advertisement sample matching the characteristic carries a plurality of types of advertisements, for each type of advertisement, a quantity of advertisement samples that match the characteristic and include the corresponding type of advertisement is determined.

For example, the advertisement sample matching the characteristic 1 carries two types of advertisements, that is, the advertisement 1 and the advertisement 2, a quantity of advertisement samples that match the characteristic 1 and carry the advertisement 1 (the quantity is 2, including the advertisement sample 1 and the advertisement sample 2) and a quantity of advertisement samples that match the characteristic 1 and carry the advertisement 2 (the quantity is 1, including the advertisement sample 2) are respectively determined.

If an advertisement sample matching one characteristic includes only one type of advertisement, for the type of advertisement, a quantity of advertisement samples that match the characteristic and include the corresponding type of advertisement is determined.

For example, the advertisement sample matching the characteristic 2 carries the advertisement 3. In this case, the quantity (being 1) of advertisement samples that match the characteristic 2 and carry the advertisement 3 is determined.

Step 1033a: Determine the quantity of advertisement samples that match the characteristic and carry the corresponding type of advertisement as the characteristic value of the characteristic corresponding to the corresponding type of advertisement.

For one characteristic, a characteristic value of the characteristic corresponding to one type of advertisement is positively correlated to a probability that the characteristic is an advertisement characteristic of a corresponding type of advertisement, representing a probability that the characteristic matches the corresponding type of advertisement. The reason is that for one type of advertisement, when a quantity of advertisement samples that match one characteristic and carry the type of advertisement is larger, it indicates that a probability that the characteristic is a characteristic of the type of advertisement is higher. Therefore, in an implementation, the quantity of advertisement samples that match the characteristic and carry the corresponding type is used as the characteristic value of the characteristic corresponding to the corresponding type of advertisement.

Figures 1, 3:
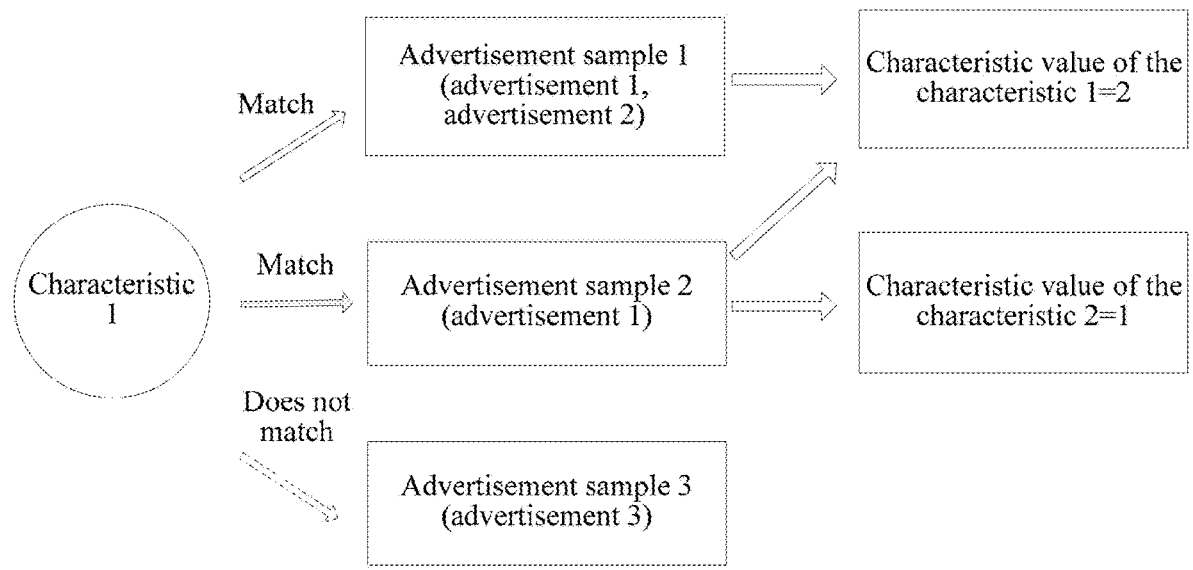
Figures 2, 3:
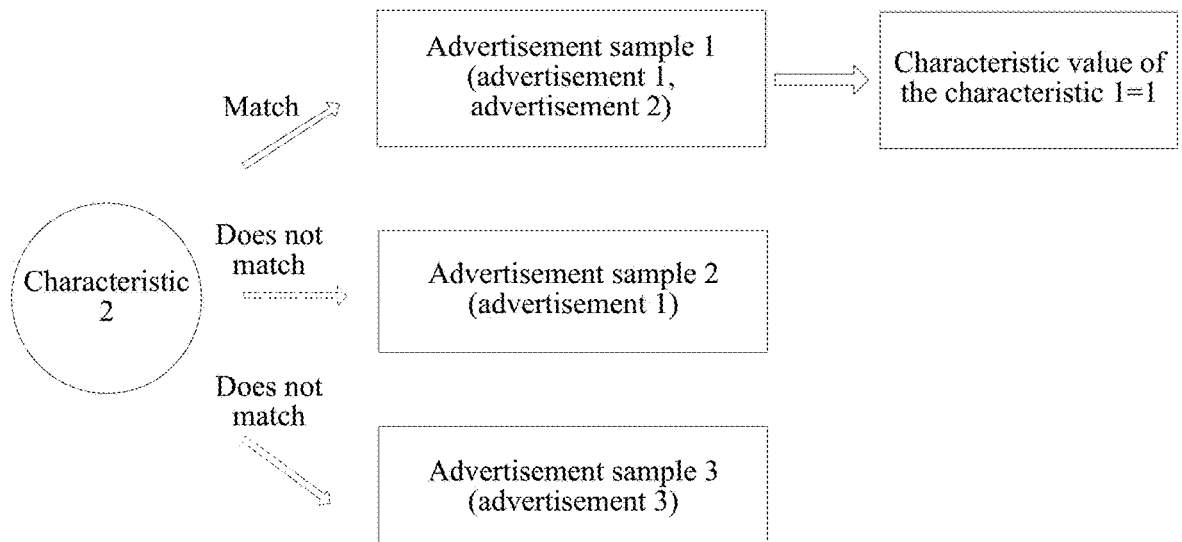

For example, with reference to FIG. 3-1, the quantity of advertisement samples that match the characteristic 1 and carry the advertisement 1 is 2. The quantity of advertisement samples that match the characteristic 1 and carry the advertisement 2 is 1. In this case, the characteristic value of the characteristic 1 corresponding to the advertisement 1 is 2, and the characteristic value of the characteristic 1 corresponding to the advertisement 2 is 1. The characteristic 1 does not match an advertisement sample carrying the advertisement 3.

Similarly, with reference to FIG. 3-2, for the characteristic 2, the quantity of advertisement samples that match the characteristic 2 and carry the advertisement 3 is 1, and the characteristic 2 does not match an advertisement sample that carries the advertisement 1 and the advertisement 2. The characteristic values of the characteristic 1 and the characteristic 2 corresponding to the types of advertisements are shown in the following Table 6:

TABLE 6

| Characteristic | Advertisement 1 | Advertisement 2 | Advertisement 3 |
| --- | --- | --- | --- |
| Characteristic 1 | 2 | 1 | \ |
| Characteristic 2 | 1 | \ | \ |

Manner 2)

In one implementation of determining a characteristic value of a characteristic, the used sample set carries an advertisement sample and further includes a non-advertisement sample. The non-advertisement sample is an application program that does not carry an advertisement, and is, for example, various application programs (including a social application, a game application, a communications application, and the like) that can be installed on a terminal device. Because the sample set carries a non-advertisement sample, the precision of using a characteristic value of a characteristic corresponding to a type of advertisement to reflect a probability that the characteristic is a characteristic of the corresponding type of advertisement can be improved. Refer to Table 7 for one example of the sample set:

TABLE 7

| Advertisement sample 1 | Advertisement sample 1 (advertisement 1, advertisement 2) |
| Advertisement sample 2 | Advertisement sample 2 (advertisement 1) |
| Advertisement sample 3 | Advertisement sample 3 (advertisement 3) |
| Non-advertisement sample 4 | \ |
| Non-advertisement sample 5 | \ |

The sample set shown in Table 7 includes the advertisement sample 1 to the advertisement sample 3 and further includes the non-advertisement sample 4 and the non-advertisement sample 5. The non-advertisement sample 4 and the non-advertisement sample 5 do not carry an advertisement.

Referring to FIG. 2-2, FIG. 2-2 is an optional schematic flowchart of determining a characteristic value of a characteristic, including step 1031b to step 1033b. The steps are described in the following.

Step 1031b: Determine different types of advertisements carried in an advertisement sample matching the characteristic.

A characteristic extracted from one advertisement sample may match other advertisement samples in the sample set, which needs to be determined through statistics based on characteristics extracted from advertisement samples and different types of advertisements included in the advertisement samples.

In Table 7, the characteristic 1 extracted from the advertisement sample 1 further matches the advertisement sample 2 in the sample set. Therefore, advertisement samples matching the characteristic 1 are the advertisement sample 1 and the advertisement sample 2. Correspondingly, it is determined that the advertisement samples matching the characteristic 1 carry two different types of advertisements, that is, the advertisement 1 and the advertisement 2.

Similarly, the characteristic 3 extracted from the advertisement sample 3 matches only the advertisement sample 3 in the sample set. Therefore, an advertisement sample matching the characteristic 2 is the advertisement sample 3. The advertisement sample matching the characteristic 2 carries only one type of advertisement, that is, the advertisement 3. The different types of advertisements included in the advertisement samples matching the characteristic 1 and the characteristic 2 are shown in Table 6.

Step 1032b: In the sample set, determine a ratio of the quantity of advertisement samples that match the characteristic and carry the different types of advertisements to a quantity of non-advertisement samples matching the characteristic as the characteristic value of the characteristic corresponding to the corresponding type of advertisement.

The quantities of advertisement samples that match the characteristic 1 and the characteristic 2 and carry the different types of advertisements are shown in Table 6. In addition, it is further assumed that the characteristic 1 is extracted from the non-advertisement sample 4 and the characteristic 1 and the characteristic 2 are extracted from the non-advertisement sample 5. Samples (an advertisement sample and a non-advertisement sample) matching the characteristic 1 and the characteristic 2 and advertisements carried in the samples are shown in the following Table 8.

TABLE 8

| Characteristic 1 | Advertisement sample 1 | Advertisement sample 1 (Advertisement 1, advertisement 2) |
| Characteristic 1 | Advertisement sample 2 | Advertisement sample 2 (advertisement 1) |
| Characteristic 2 | Advertisement sample 3 | Advertisement sample 3 (advertisement 3) |
| Characteristic 1 | Non-advertisement sample 4 | \ |
| Characteristic 2 | Non-advertisement sample 5 | \ |

Step 1033b: Determine, based on the quantity of advertisement samples that match the characteristic and carry the different types of advertisements and the quantity of non-advertisement samples matching the characteristic, the characteristic value of the characteristic corresponding to the corresponding type of advertisement.

For one characteristic, a characteristic value of the characteristic corresponding to any type of advertisement represents a probability that the characteristic is an advertisement characteristic of the corresponding type of advertisement. The reason is that for one type of advertisement, when one characteristic matches more advertisement samples carrying the type of advertisement, the quantity of matching non-advertisement samples carrying the characteristic is smaller, and it indicates that a probability that the characteristic is an advertisement characteristic of the type of advertisement is larger.

Based on the analysis, in an implementation, the ratio of the quantity of advertisements samples that match the characteristic and carry the different types of advertisements to the quantity of non-advertisement samples that match the characteristic and carrying the corresponding characteristic is used as the characteristic value of the characteristic corresponding to the corresponding type of advertisement. It may be understood that if the ratio is greater than 1, normalization processing may be performed.

A non-advertisement sample is introduced in a sample set. A quantity of non-advertisement samples that match a characteristic and carry the characteristic is used as an adjustment factor to adjust a quantity of advertisement samples that match the characteristic and carry the characteristic to obtain the characteristic value of the characteristic corresponding to the corresponding type of advertisement. Because a case that a characteristic may be a characteristic of an application program itself is considered, the obtained characteristic value can represent more precisely a probability that the characteristic is an advertisement characteristic of one of the different types of advertisements.

Figures 1, 4:
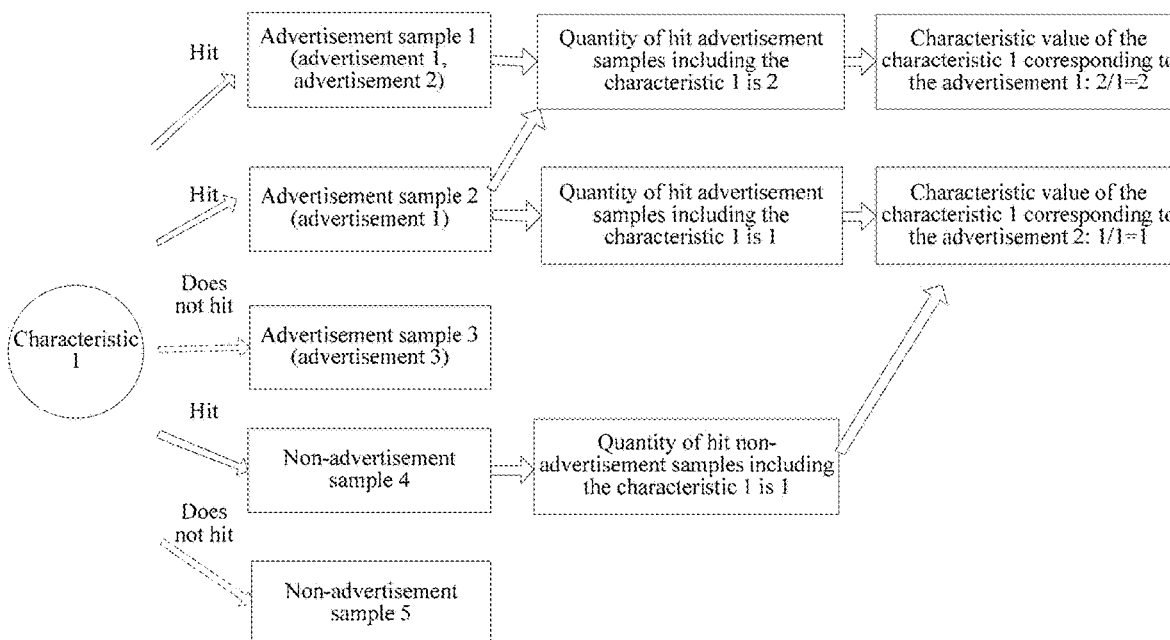
Figures 2, 4:
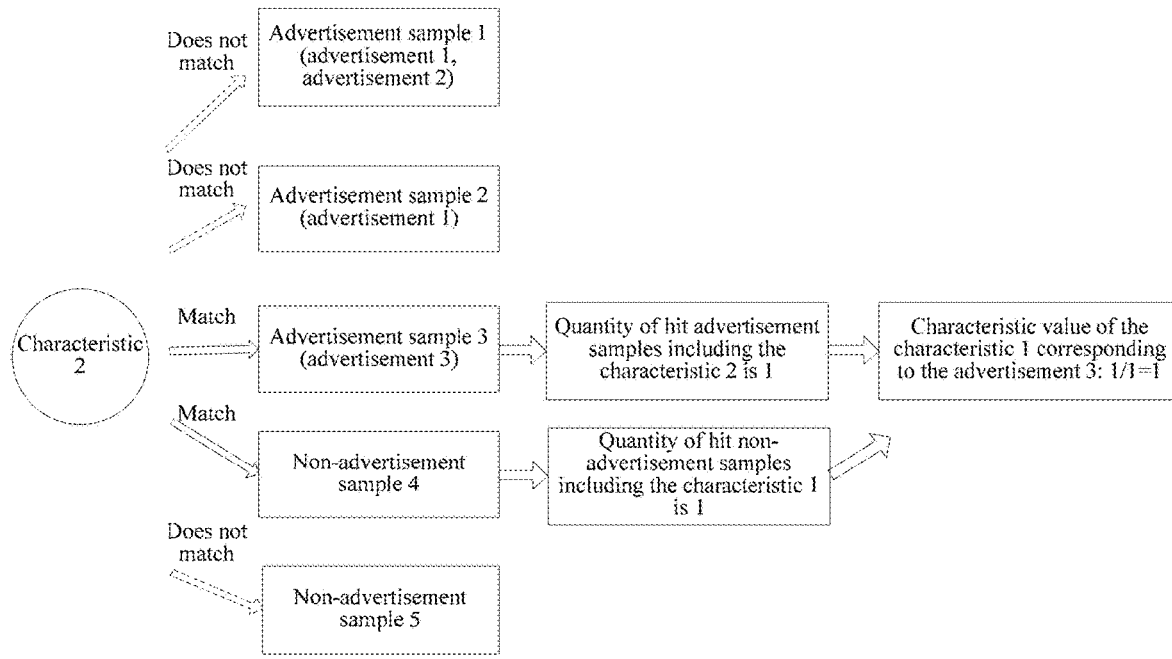

For example, with reference to FIG. 4-1, for the characteristic 1, the quantity of advertisement samples that match the characteristic 1 and carry the advertisement 1 is 2, the characteristic 1 does not match the advertisement sample 3 carrying the advertisement 3, and the quantity of non-advertisement samples that match the characteristic 1 and carry the characteristic 1 is 1 (the non-advertisement sample 4). In this case, the characteristic value of the characteristic 1 corresponding to the advertisement 1 is a ratio of the quantity of advertisement samples to the quantity of non-advertisement samples (2/1=2).

Further, for example, the quantity of advertisement samples that match the characteristic 1 and carry the advertisement 2 is 1 (corresponding to the advertisement sample 2), the characteristic 1 does not match the advertisement sample 3 carrying the advertisement 3, and the quantity of non-advertisement samples that match the characteristic 2 and carry the characteristic 2 is 1. In this case, the characteristic value of the characteristic 1 corresponding to the advertisement 1 is a ratio of the quantity of advertisement samples to the quantity of non-advertisement samples (1/1/=1).

Similarly, with reference to FIG. 4-2, for the characteristic 2, the quantity of advertisement samples that match the characteristic 2 and carry the advertisement 3 is 1, the characteristic 2 does not match an advertisement sample carrying the advertisement 1 and the advertisement 2, and the quantity of non-advertisement samples that match the characteristic 2 and carry the characteristic 2 is 1 (corresponding to the non-advertisement sample 5). In this case, the characteristic value of the characteristic 2 corresponding to the advertisement 2 is a ratio of the quantity of advertisement samples to the quantity of non-advertisement samples (1/1=1).

The characteristic values of the characteristic 1 and the characteristic 2 corresponding to the corresponding types of advertisement are shown in the following Table 9:

TABLE 9

| Characteristic | Advertisement 1 | Advertisement 2 | Advertisement 3 |
|---|---|---|---|
| Characteristic 1 | 2 | 1 | \ |
| Characteristic 2 | 1 | \ | \ |

It may be seen that when the quantity of advertisement samples that match the characteristic and carry the characteristic is divided by the quantity of non-advertisement samples that match the characteristic and carry the characteristic to obtain a result for use as the characteristic value of the characteristic corresponding to the corresponding type of advertisement, the following effects can be achieved: A characteristic value that is obtained when a quantity of non-advertisement samples that match a characteristic and carry the characteristic is larger is less than a characteristic value that is obtained when the quantity of non-advertisement samples that match the characteristic and carry the characteristic, and a characteristic value obtained through calculation by using the matching in both the dimension of advertisement samples and the dimension of non-advertisement samples can more precisely represent a probability that the characteristic is an advertisement characteristic.

As another example of step 1033b, a ratio of the quantity of advertisement samples that match the characteristic and carry the different types of advertisements to a sum is calculated and determined as the characteristic value of the characteristic corresponding to the corresponding type of advertisement.

A characteristic has corresponding characteristic values for the different types of advertisements. That is, characteristic values of a characteristic correspond to advertisement types one by one. A characteristic value of a characteristic corresponding to one type of advertisement is obtained by calculating a ratio of a quantity of samples that match the characteristic and carry the type of advertisement to a sum. The sum is a sum of the following quantities: the quantity of advertisement samples that match the characteristic and carry the type of advertisement, that is, a quantity of advertisement samples in the sample set that carry the characteristic; and a quantity of non-advertisement samples that match the characteristic and do not carry the type of advertisement.

It may be understood that because the characteristic value represents a ratio of the quantity of advertisement samples that match the characteristic and carry one type of advertisement to the quantity of all samples (advertisement samples and non-advertisement samples) that match the characteristic, the characteristic value may also be considered to represent a hit rate of the characteristic for an advertisement carrying the characteristic. Certainly, normalization processing needs to be performed on the characteristic value.

The characteristic value of the characteristic 1 corresponding to the advertisement 1 is used as an example. The quantity of advertisement samples in the sample set that carry the characteristic 1 and the quantity of non-advertisement samples in the sample set that carry the characteristic 1 are calculated first, a sum of the two quantities is calculated, and a ratio of the quantity of advertisement samples in the sample set that carry the characteristic 1 to the sum is then calculated.

Figures 1, 5:
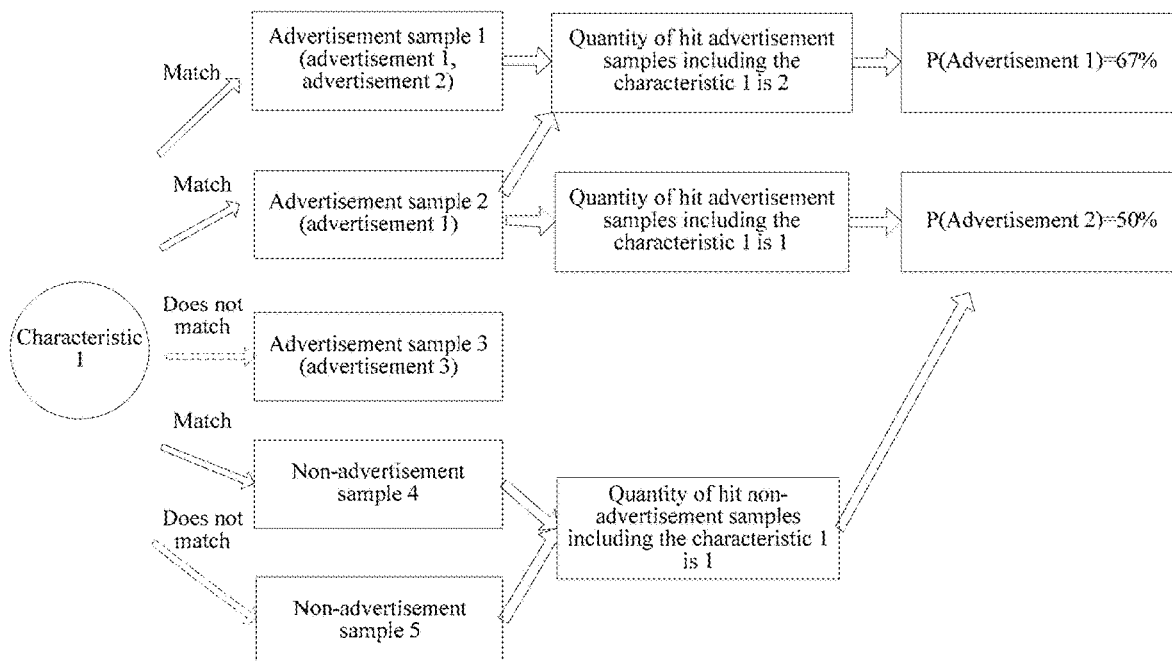
Figures 2, 5:
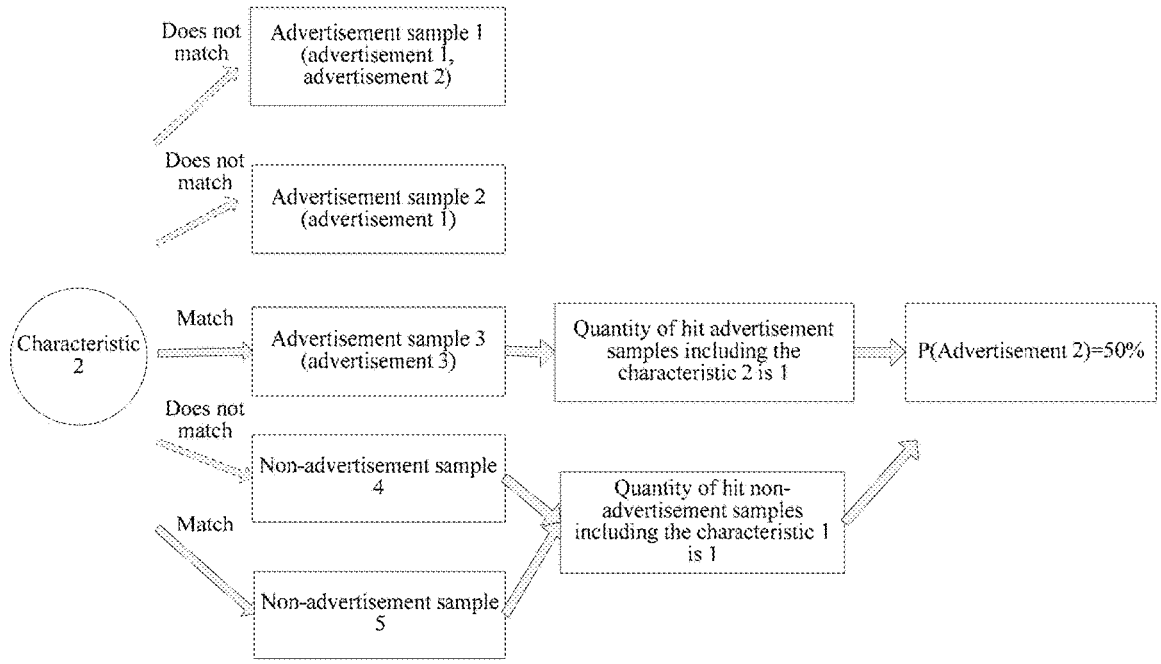

For example, with reference to FIG. 5-1, for the characteristic value of the characteristic 1 corresponding to the advertisement 1, the quantity of advertisement samples that match the characteristic 1 and carry the advertisement 1 is 2, the characteristic 1 does not match the advertisement sample 3 carrying the advertisement 3, and the quantity of non-advertisement samples that match the characteristic 1 and carry the characteristic 1 is 1 (corresponding to the non-advertisement sample 4). In this case, the characteristic value of the characteristic 1 corresponding to the advertisement 1 is a hit rate, marked as P (corresponding to the advertisement 1). P (corresponding to the advertisement 1) is 2/(1+2)=67%.

Further, for example, for the characteristic value of the characteristic 1 corresponding to the advertisement 2, the quantity of advertisement samples that match the characteristic 1 and carry the advertisement 2 is 1 (corresponding to the advertisement sample 2), the characteristic 1 does not match the advertisement sample 3 carrying the advertisement 3, and the quantity of non-advertisement samples that match the characteristic 1 and carry the characteristic 2 is 1 (corresponding to the non-advertisement sample 5). In this case, the characteristic value of the characteristic 1 corresponding to the advertisement 1 is a hit rate P (corresponding to the advertisement 2). P (corresponding to the advertisement 2) is 1/(1+1)=50%.

Similarly, with reference to FIG. 5-2, for the characteristic value of the characteristic 2 corresponding to the advertisement 3, it is determined that the quantity of advertisement samples that match the characteristic 2 and carry the advertisement 3 is 1 (corresponding to the advertisement sample 3), the characteristic 2 does not match an advertisement sample carrying the advertisement 1 and the advertisement 2, and the quantity of non-advertisement samples that match the characteristic 2 and carry the characteristic 2 is 1 (the non-advertisement sample 5). In this case, the characteristic value P (the advertisement 2) of the characteristic 2 corresponding to the advertisement 2 is a ratio of the two 1/(1+1)=50%.

Characteristic values, that is, hit rates, of the characteristic 1 and the characteristic 2 corresponding to the corresponding type of advertisement are shown in the following Table 10:

TABLE 10

| Characteristic | Advertisement 1 | Advertisement 2 | Advertisement 3 |
|---|---|---|---|
| Characteristic 1 | 67% | 50% | \ |
| Characteristic 2 | 50% | \ | \ |

It is readily easy to understand according to the records that for two characteristics, which are set to be a characteristic a and a characteristic b, it is assumed that the characteristic a and the characteristic b match the same quantity of advertisement samples, and a quantity of non-advertisement samples matching the characteristic a is greater than a quantity of non-advertisement samples matching the characteristic b. The characteristic a matches more non-advertisement samples than the characteristic b does. In this case, when the characteristic a and the characteristic b are compared, a probability that the characteristic a is an advertisement characteristic is less than a probability that the characteristic b is an advertisement characteristic.

In the manner of calculating a characteristic value, the quantity of advertisement samples that match the characteristic and carry the characteristic is divided by a sum (that is, a sum of the quantity of non-advertisement samples that match the characteristic and carry the characteristic and the quantity of advertisement samples that match the characteristic and carry the characteristic), so that both information in the dimension of a quantity of advertisement samples matching a characteristic and information in the dimension of a quantity of non-advertisement samples matching a characteristic are taken into consideration, and characteristic values of the characteristic a and the characteristic b can be precisely distinguished. That is, a characteristic value of a characteristic is calculated by using both the dimension of a quantity of advertisement samples that match the characteristic and carry the characteristic and the dimension of a quantity of all samples (advertisement samples and non-advertisement samples) that match the characteristic and carry the characteristic, so that the characteristic value can be more precise.

Step 104: Filter, based on characteristic values of the characteristic that correspond to the different types of advertisements, the extracted characteristics to obtain advertisement characteristics of the different types of advertisements.

Figure 6:
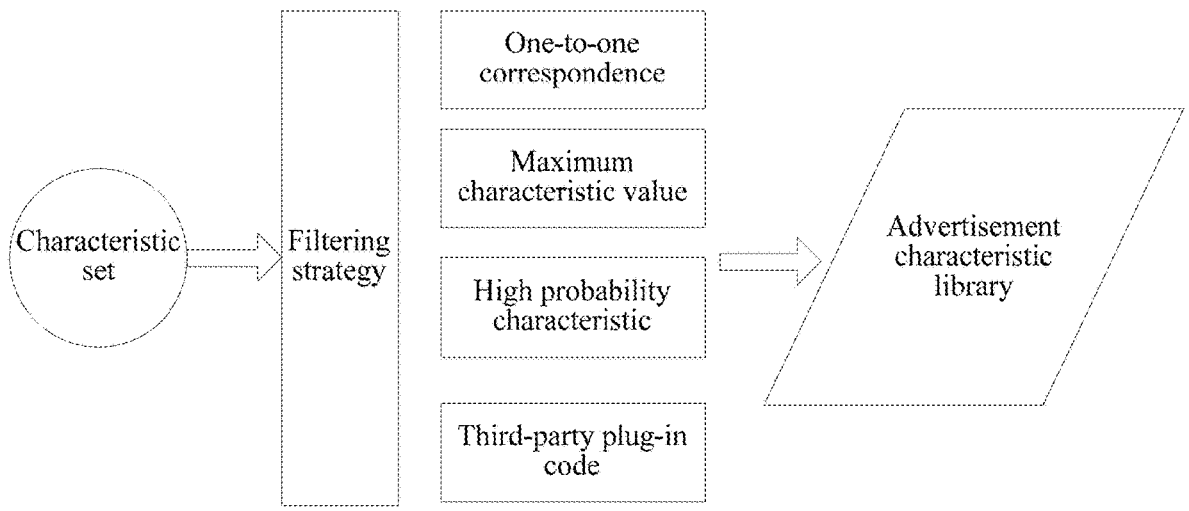
FIG. 6 is an optional schematic processing diagram of filtering advertisement characteristics in an advertisement detection method according to an embodiment of the present disclosure.

Step 101 to step 103 may be used to obtain a set formed of a plurality of characteristics (referred to as a characteristic set) and characteristic values of each characteristic that correspond to the different types of advertisements. As shown in FIG. 6, different filtering strategies are used to perform filtering to obtain advertisement characteristics corresponding to the different types of advertisements and form an advertisement characteristic library. Advertisement characteristics of the different types of advertisements that are obtained through filtering by using different filtering strategies are described below with reference to FIG. 6.

Filtering Strategy 1) Advertisements Correspond to Characteristics One by One

For each type of advertisement, it is determined that a characteristic of an only matching advertisement sample carrying the type of advertisement is an advertisement characteristic of the corresponding type of advertisement. When the only matching advertisement sample including the type of advertisement has a plurality of characteristics, a characteristic having the largest characteristic value is selected as an advertisement characteristic of the type of advertisement.

As discussed above, an advertisement sample matching a characteristic may include a plurality of types of advertisements. In this case, the characteristic has corresponding characteristic values corresponding to the plurality of types of advertisements. For example, the characteristic 1 has corresponding characteristic values corresponding to both the advertisement 1 and the advertisement 2. An advertisement sample matching a characteristic may include one type of advertisement. In this case, the characteristic has a corresponding characteristic value corresponding to the type of advertisement. For example, the characteristic 2 corresponds to only the advertisement 2, and the characteristic 2 has a characteristic value corresponding to the advertisement 2.

In Manner 1), for one type of advertisement, if an advertisement sample carrying the advertisement includes a plurality of characteristics, in this case, among the plurality of characteristics, a characteristic whose matching advertisement sample includes only the type of advertisement is preferentially selected as an advertisement characteristic of the type of advertisement. That is, a characteristic that has a one-to-one correspondence with an advertisement is preferentially selected as the advertisement characteristic of the advertisement.

For example, for the advertisement 1, the advertisement samples matching the characteristic 1 and the characteristic 2 both carry the advertisement 1. In addition, the characteristic 1 further matches the advertisement sample 1 carrying the advertisement 3, and the characteristic 2 matches the advertisement sample 2 carrying only the advertisement 3. In this case, a one-to-one correspondence is formed between the characteristic 2 and the advertisement 3. The characteristic 2 is preferentially selected as an advertisement characteristic of the advertisement 3.

Filtering Strategy 2) Maximum Characteristic Value

For each characteristic, when the characteristic matches an advertisement sample including a plurality of types of advertisements, based on a characteristic value of the characteristic corresponding to each of a plurality of types of advertisements, the characteristic is determined to be a characteristic value of a corresponding type of advertisement corresponding to a maximum characteristic value.

As discussed above, for each type of advertisement included in an advertisement sample in a sample set, at least one characteristic matches an advertisement sample including the type of advertisement. In this case, a one-to-one correspondence is formed between the characteristic and the advertisement. In Manner 2), when a one-to-more relationship is formed between a corresponding characteristic and an advertisement, that is, when one characteristic matches an advertisement sample including a plurality of types of advertisements, the processing of filtering characteristic values is described.

If one characteristic matches an advertisement sample carrying a plurality of types of advertisements, characteristic values of the characteristic corresponding to the plurality of types of advertisements (that is, the different types of advertisements included in the advertisement sample matching the characteristic) are compared. If a characteristic value of the characteristic corresponding to one type of advertisement is larger, a probability that the characteristic is an advertisement characteristic of the type of advertisement is higher. Therefore, it is obtained through comparison for which type of advertisement the characteristic has a maximum characteristic value, and the characteristic is used as the characteristic value of the type of advertisement.

For example, the characteristic 1 matches an advertisement sample carrying the advertisement 1 and the advertisement 2. In this case, the characteristic value (67%) of the characteristic 1 corresponding to the advertisement 1 is compared with the characteristic value of the characteristic 1 corresponding to the advertisement 2 (50%). The corresponding type of advertisement when the characteristic 1 has the larger characteristic value (67%) is the advertisement 1. Therefore, the characteristic 1 is used as an advertisement characteristic of the advertisement 1.

Filtering Strategy 3) High Probability Characteristic

For characteristic values of a characteristic for different types of advertisements, a characteristic whose characteristic value exceeds a characteristic value threshold is selected as an advertisement characteristic of a corresponding type of advertisement, that is, a high-probability characteristic matching a type of advertisement is selected as an advertisement characteristic of a corresponding type of advertisement.

A characteristic value of a characteristic corresponding to any type of advertisement represents a probability that the characteristic matches the type of advertisement, that is, is positively correlated to a hit rate. Therefore, for one type of advertisement, if a plurality of characteristics match an advertisement sample carrying the type of advertisement, comparison is performed to find whether a characteristic value of each characteristic corresponding to the type of advertisement exceeds the characteristic value threshold. If yes, the characteristic is used as an advertisement characteristic of the corresponding type of advertisement. Correspondingly, at least one corresponding advertisement characteristic may be determined for one type of advertisement.

For example, the characteristic 1 matches an advertisement sample carrying the advertisement 1 and the advertisement 2. The characteristic value of the characteristic 1 corresponding to the advertisement 1 is 67%, and the characteristic value of the characteristic corresponding to the advertisement 2 is 50%. If the characteristic value threshold is 60%, the characteristic 1 is an advertisement characteristic of the advertisement 1.

Manner 4) Whether a Characteristic is a Characteristic of Third-Party Plug-in Code A characteristic corresponding to third-party plug-in code is filtered out from the extracted characteristics. The third-party plug-in code includes a payment plug-in and an account login software development kit. A characteristic of third-party plug-in code is filtered out from characteristics, so as to effectively avoid a case of incorrectly detecting that a sample carries an advertisement because of some essential functions such as a payment function and a login function in an application.

The strategies of filtering characteristic values may be flexibly chosen in an actual application. For example, only one strategy is chosen to perform filtering, or several strategies are chosen to perform filtering without causing a conflict. An example of combining Manner 1) and Manner 3) is used as an example. If such a case occurs, when a plurality of characteristics match advertisement samples that include only one type of advertisement, that is, the plurality of characteristics all have a one-to-one correspondence to one type of advertisement, among the plurality of characteristics, a characteristic that corresponds to the type of advertisement and has the largest characteristic value is selected as an advertisement characteristic of the type of advertisement.

For example, for the advertisement 2, the characteristic 2 corresponds to the advertisement 3 one by one, and a hit rate of the characteristic 2 for an advertisement sample of the advertisement 3 is 50%. If the characteristic 3 further corresponds to the advertisement 3 one by one and a hit rate of the characteristic 3 for the advertisement sample carrying the advertisement 3 is 30%, in this case, the characteristic 2 is preferentially selected as an advertisement characteristic of the advertisement 3.

Step 105: Match the advertisement characteristics of the different types of advertisements against characteristics extracted from a to-be-detected sample, and determine, when a match is found, that the to-be-detected sample carries an advertisement, and carries an advertisement of a type corresponding to a matching advertisement characteristic.

In an implementation, after it is detected whether a to-be-detected sample carries an advertisement, a detected sample and the type of an advertisement included in the sample may be updated to a sample set as a new advertisement sample, and a detected sample that does not carry an advertisement may be updated to the sample set as a new non-advertisement sample. Characteristics are filtered again based on the new advertisement sample (or based on the new advertisement sample and the new non-advertisement sample) to update advertisement characteristics in an advertisement characteristic library. In this way, advertisement characteristics can be synchronously updated according to a to-be-detected sample without needing to manually determine a new sample (determine whether the new sample carries an advertisement), so that the advertisement that newly appears in the sample can be accurately detected and the efficiency of advertisement detection can be improved.

Figure 7:
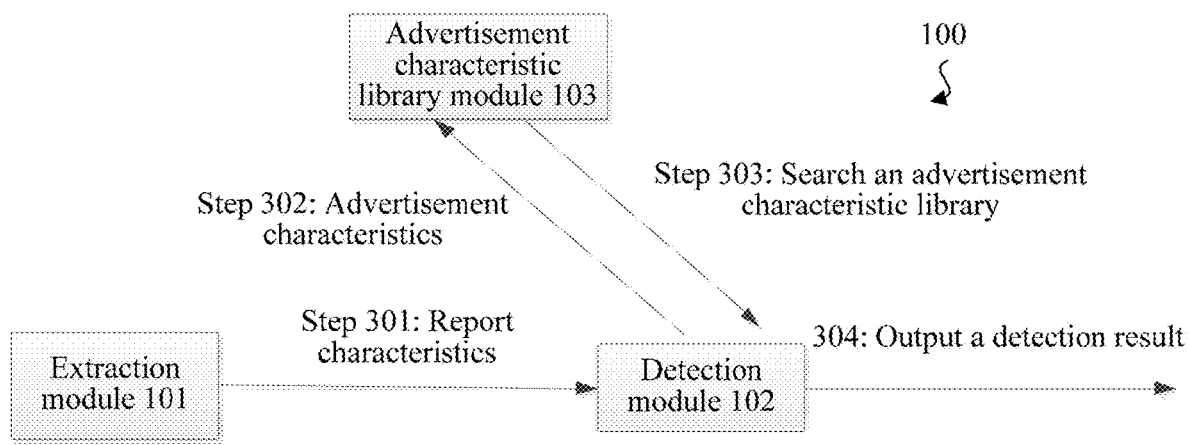
FIG. 7 is an optional schematic structural diagram of an advertisement detection apparatus according to an embodiment of the present disclosure.

An advertisement detection apparatus for implementing the advertisement detection method is described. FIG. 7 is an optional schematic structural diagram of an advertisement detection apparatus 100, including an extraction module 101, a detection module 102, and an advertisement characteristic library module 103.

The extraction module 101 is configured to obtain a sample set formed of advertisement samples carrying an advertisement, extract characteristics of the advertisement samples in the set (step 301), and report the characteristics to the detection module 102.

The detection module 102 determines different types of advertisements carried in an advertisement sample matching an characteristic, and determines characteristic values of the characteristic that correspond to the different types of advertisements, each of the characteristic values representing a probability that the characteristic is an advertisement characteristic of a corresponding type of advertisement; and filters, based on the characteristic values of the characteristic that correspond to the different types of advertisements, the extracted characteristics to obtain advertisement characteristics of the different types of advertisements, and stores the advertisement characteristics in the advertisement characteristic library module 103 (step 302).

Figure 8:
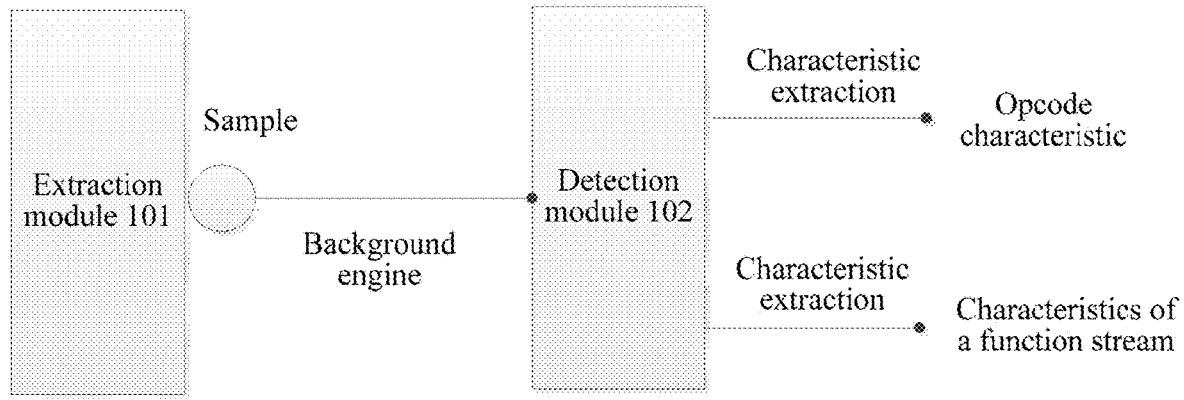
FIG. 8 is an optional schematic processing diagram of extracting advertisement characteristics by an advertisement detection apparatus according to an embodiment of the present disclosure.

In an implementation, with reference to FIG. 8, the extraction module 101 determines the different types of advertisements included in advertisement samples matching a characteristic; determines, for each type of advertisement, a quantity of advertisement samples that match the characteristic and carry the corresponding type of advertisement, and determines, based on the quantity, a characteristic value of the characteristic corresponding to the corresponding type of advertisement. A characteristic value is determined in the following manners:

Manner 1): The quantity of advertisement samples that match the characteristic and carry the corresponding type of advertisement is determined as the characteristic value of the characteristic corresponding to the corresponding type of advertisement.

Manner 2): The characteristic value of the characteristic corresponding to the corresponding type of advertisement is determined based on the quantity of non-advertisement samples in the sample set that match the characteristic and the quantity of advertisement samples that match the characteristic and carry the corresponding type of advertisement.

Manner 3): A ratio of the quantity of advertisement samples that match the characteristic and include the corresponding type of advertisement to a sum is determined as the characteristic value of the characteristic corresponding to the corresponding type of advertisement.

The sum is a sum of the quantity of non-advertisement samples in the sample set that match the characteristic and the quantity of advertisement samples that match the characteristic and include the corresponding type of advertisement. Therefore, the characteristic value corresponding to one type of advertisement in Manner 3) may be considered as a hit rate that a characteristic matches a corresponding type of advertisement.

For Manner 3), for example, a ratio of the quantity of advertisement samples that match the characteristic and carry the corresponding type of advertisement to the quantity of non-advertisement samples matching the characteristic is calculated, to obtain the characteristic value of the characteristic corresponding to the corresponding type of advertisement; or, a ratio of the quantity of advertisement samples that match the characteristic and carry the corresponding type of advertisement to a sum is calculated, to obtain the characteristic value of the characteristic corresponding to the corresponding type of advertisement. The sum is a sum of the quantity of non-advertisement samples matching the characteristic and the quantity of advertisement samples that match the characteristic and carry the corresponding type of advertisement.

When it needs to be determined whether a to-be-detected sample carries an advertisement, advertisement characteristics of different types of advertisements are extracted from the advertisement characteristic library module 103 (step 303). The advertisement characteristics of the different types of advertisements are matched against characteristics extracted from the to-be-detected sample, it is determined, when a match is found, that the to-be-detected sample includes an advertisement of a type corresponding to a matching advertisement characteristic, and a detection result corresponding to the to-be-detected sample is output (step 304).

Figure 9:
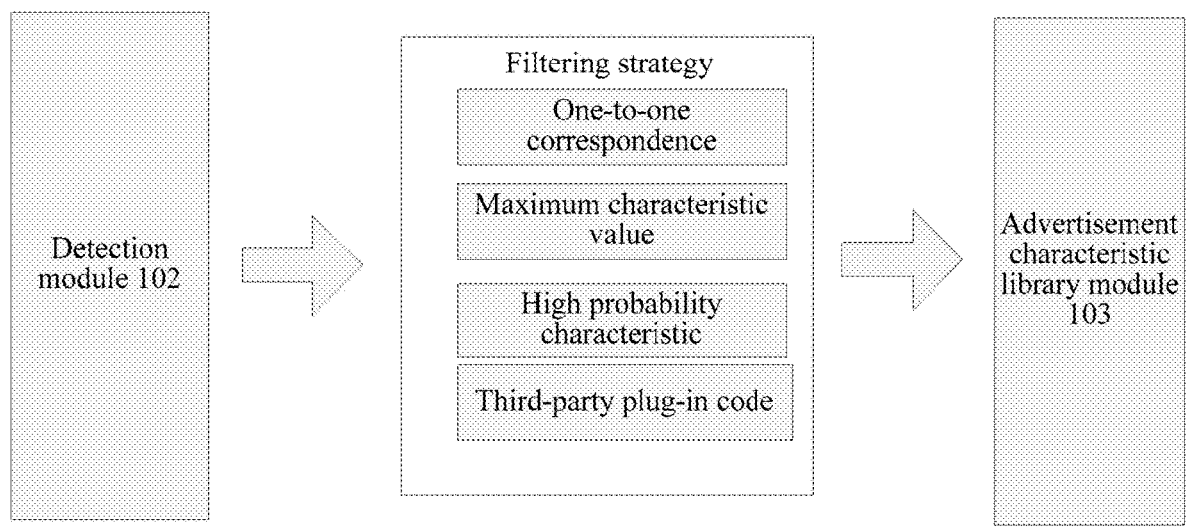
FIG. 9 is an optional schematic processing diagram of filtering advertisement characteristics by an advertisement detection apparatus according to an embodiment of the present disclosure.

With reference to FIG. 9, the detection module 102 may use a plurality of strategies to filter the extracted characteristics to obtain the advertisement characteristics corresponding to the different types of advertisements. The plurality of strategies are described below. The plurality of strategies can be used in combination without causing any conflict.

1) For each type of advertisement, a characteristic that matches only an advertisement sample carrying the corresponding type of advertisement is determined as an advertisement characteristic of the corresponding type of advertisement.

When an only matching advertisement sample comprising the corresponding type of advertisement has a plurality of characteristics, a characteristic having the largest characteristic value is selected as an advertisement characteristic of the corresponding type of advertisement.

2) It is determined, for each characteristic, when the characteristic matches an advertisement sample carrying a plurality of types of advertisements, an advertisement of a corresponding type when the characteristic has a maximum characteristic value, and the characteristic is determined as a characteristic value of the corresponding type of advertisement.

3) A characteristic whose characteristic value exceeds a characteristic value threshold is selected as an advertisement characteristic of a corresponding type of advertisement based on the characteristic values of the characteristic that correspond to the different types of advertisements.

When Manner 1) is used in combination, even if one characteristic corresponds to one type of advertisement one by one, if a characteristic value of the characteristic corresponding to the corresponding type of advertisement does not exceed the characteristic value threshold, it represents that a probability that the characteristic is a characteristic of the corresponding type of advertisement is small and does not have the significance of an advertisement characteristic.

The three manners can all be used in combination with the following manner 4): A characteristic corresponding to third-party plug-in code is filtered out from the extracted characteristics. The third-party plug-in code includes a payment plug-in and an account login software development kit, so as to avoid a case of incorrectly detecting an embedded advertisement because of some essential functions in an application.

In an implementation, after the detection module 102 finishes detecting the to-be-detected sample, the extraction module 101 updates the sample set according to a detection result (whether the to-be-detected sample carries an advertisement, and the type of the carried advertisement) of the to-be-detected sample: The to-be-detected sample is used as a new advertisement sample when the to-be-detected sample carries an advertisement, and the to-be-detected sample is used as a new non-advertisement sample when the to-be-detected sample does not carry an advertisement. Characteristics of advertisement samples are extracted from the updated sample set. The detection module 102 filters the extracted characteristics again to obtain the advertisement characteristics of the different types of advertisements and update the advertisement characteristic library module 103. The to-be-detected sample is used to iteratively update the advertisement characteristics in the advertisement characteristic library module 103. In this way, provided that the to-be-detected sample includes a new advertisement, an advertisement characteristic corresponding to the new advertisement can be automatically extracted, so as to implement accurate detection on a sample including a new advertisement.

Figure 11:
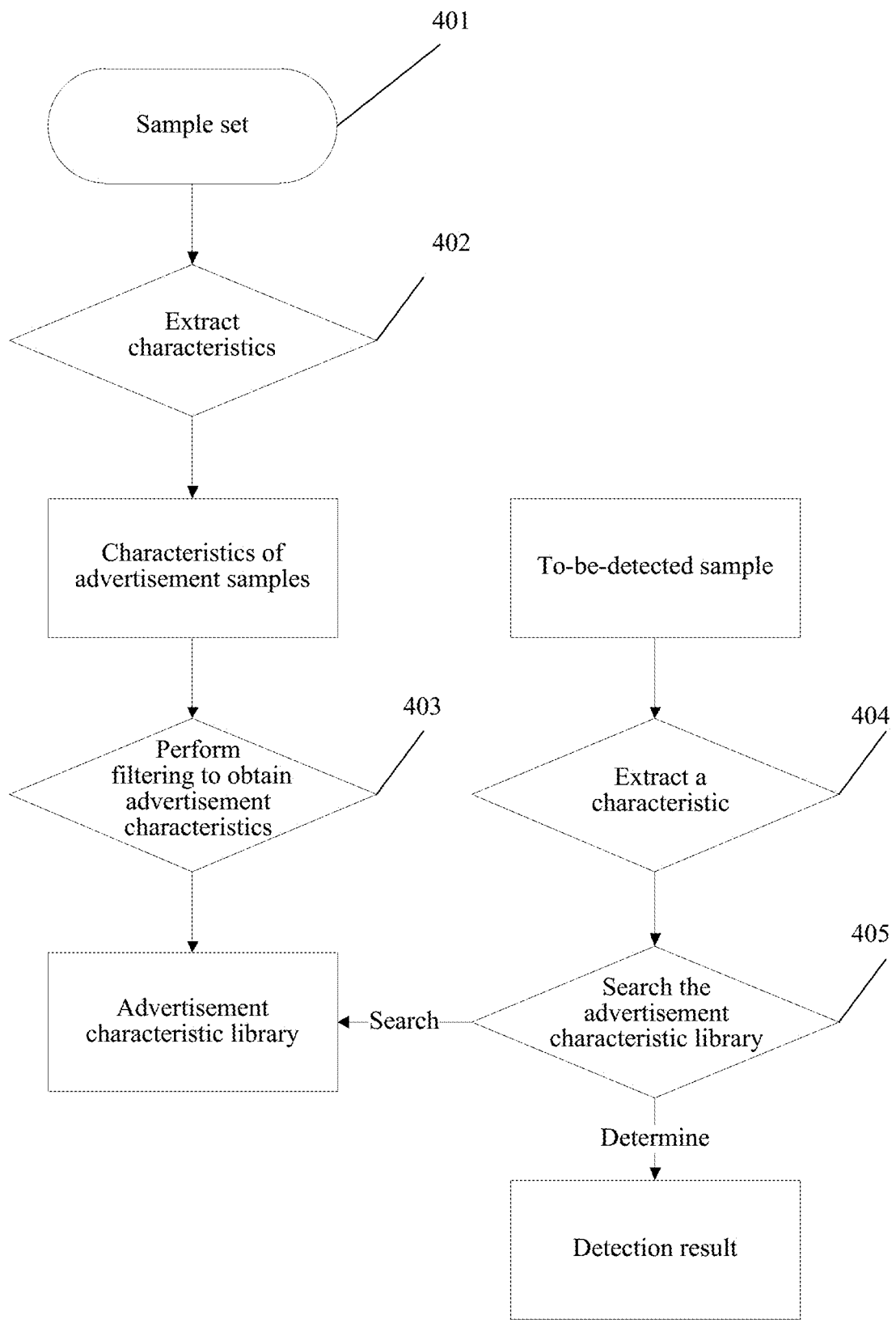
FIG. 11 is still another optional schematic flowchart of an advertisement detection method according to an embodiment of the present disclosure.

FIG. 11 is an optional schematic flowchart of an advertisement detection apparatus detecting an advertisement. The extraction module 101 obtains a sample set (step 401, the sample set carries advertisement samples, and a non-advertisement set may further be included). With reference to FIG. 8, the extraction module 101 extracts characteristics of advertisement samples from the sample set by using a background engine (step 402). The characteristics are, for example, Opcode characteristics, or characteristics of a function stream that are extracted from code of the advertisement samples.

With reference to FIG. 9, the detection module 102 filters the extracted characteristics to obtain characteristic that correspond to the different types of advertisements, that is, advertisement characteristics (step 403) and stores the advertisement characteristics in the advertisement characteristic library module 103.

Figure 10:
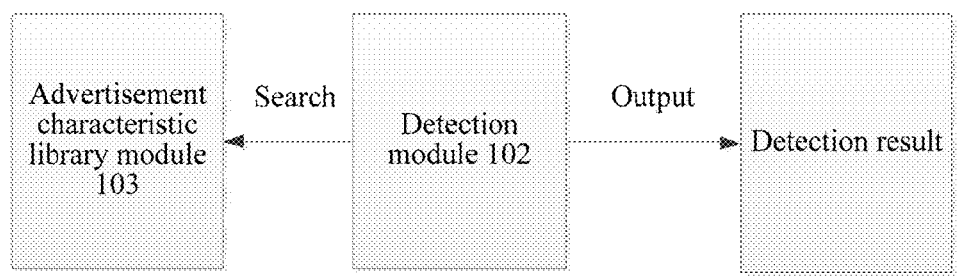
FIG. 10 is an optional schematic processing diagram of searching for advertisement characteristics by an advertisement detection apparatus according to an embodiment of the present disclosure.

With reference to FIG. 10, when it needs to be determined whether a to-be-detected sample carries an advertisement, the detection module 102 extracts a characteristic from the to-be-detected sample (step 404), searches the advertisement characteristic library module 103 to find whether there is a corresponding advertisement characteristic, determines, if yes, that the to-be-detected advertisement includes a corresponding type of advertisement, or determines, if not, that the to-be-detected sample does not carry an advertisement, and outputs a detection result corresponding to the to-be-detected sample (step 405).

Figure 12:
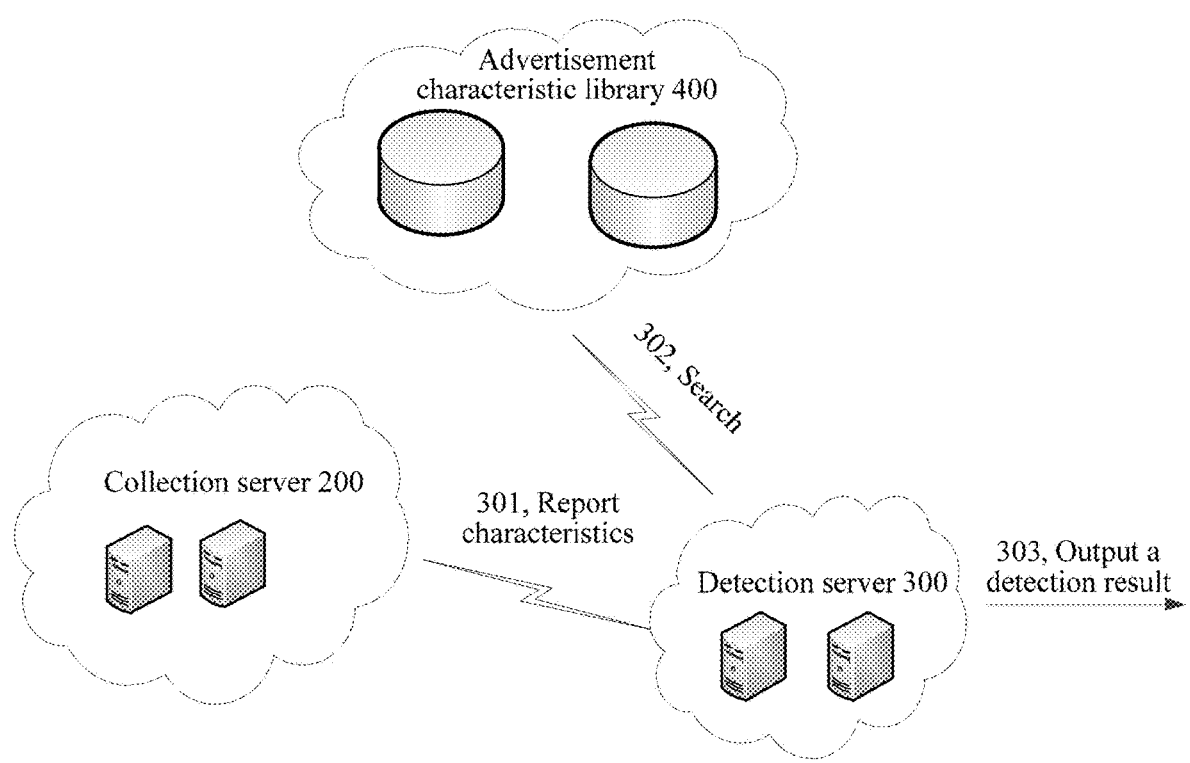
FIG. 12 is an optional schematic topological diagram of an advertisement detection apparatus according to an embodiment of the present disclosure.

In an actual application, the modules may be implemented by a server or a server cluster running an executable program configured to detect an advertisement. The implementation of a server cluster is used as an example. FIG. 12 is an optional schematic topological diagram of an advertisement detection apparatus. In FIG. 12, the extraction module 101 is implemented a collection server 200, the detection module 102 is implemented as the detection server 300, and the advertisement characteristic library module 103 is implemented as an advertisement characteristic library 400. The collection server extracts characteristics from advertisement samples in the sample set and reports the extracted characteristics to the detection server (step 301).

Figure 13:
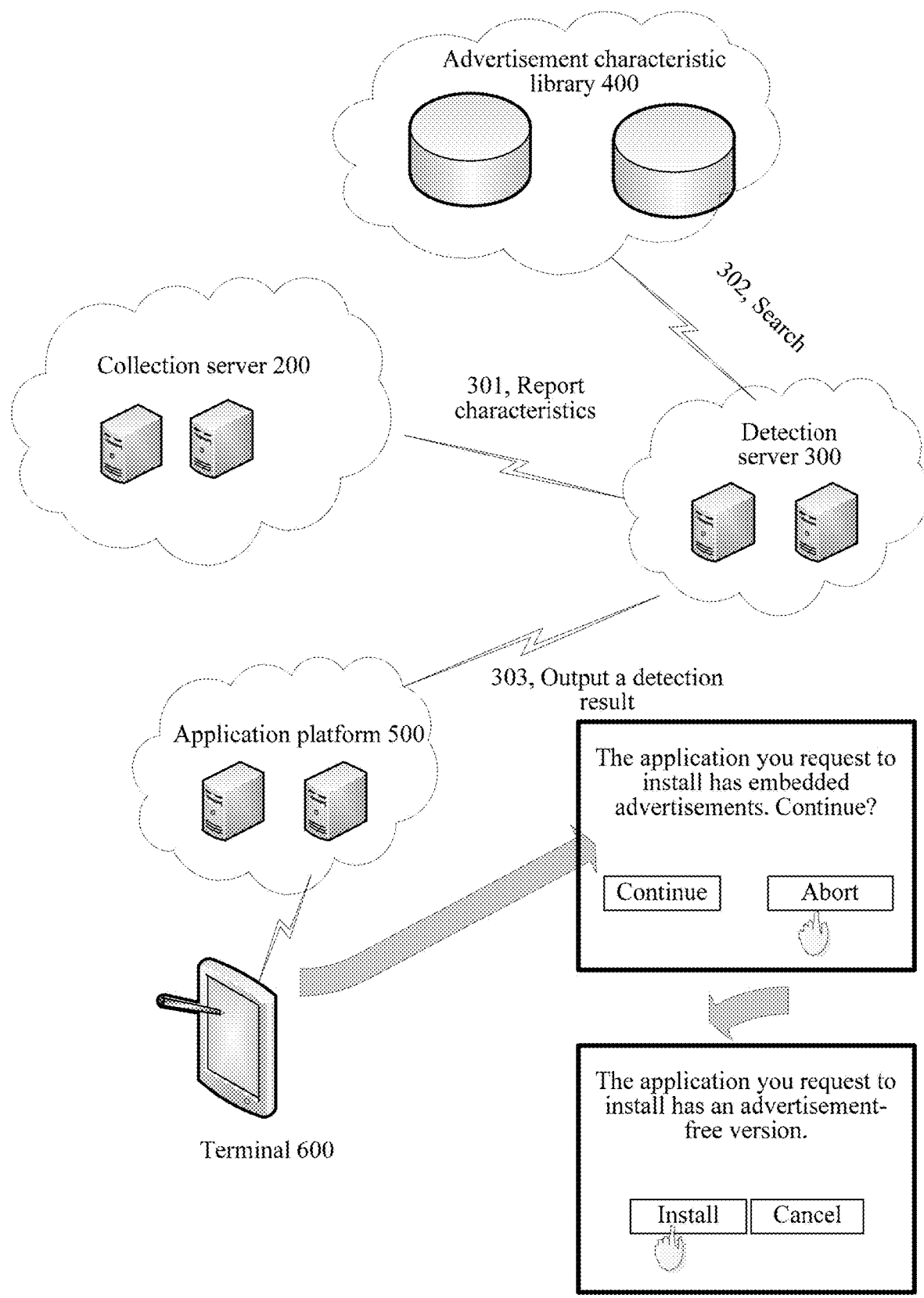
FIG. 13 is an optional schematic scenario diagram of performing advertisement detection by an advertisement detection apparatus according to an embodiment of the present disclosure.
Figure 14:
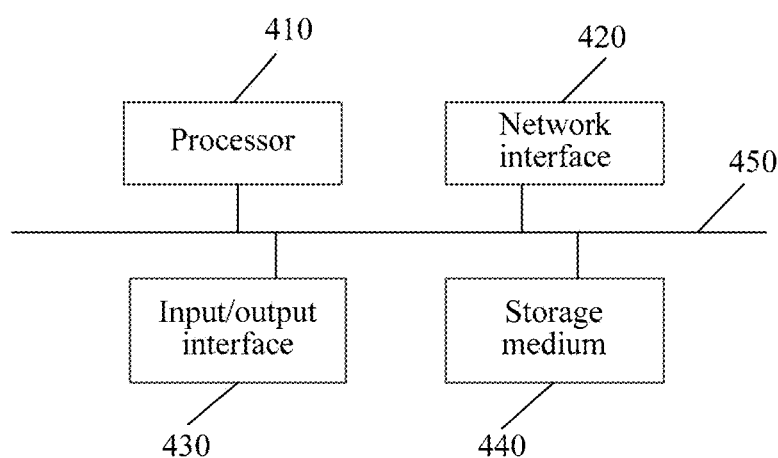
FIG. 14 is an optional schematic structure hardware diagram when an advertisement detection apparatus being implemented as a server according to an embodiment of the present disclosure.

In one application example in which an advertisement detection apparatus shown in FIG. 13 is implemented as the advertisement characteristic library 400, the detection server 300, and the collection server 200. After it is detected whether an application (to-be-detected sample) carries an advertisement, a detection result and the application are published together on an application platform 500. When a user of a terminal 600 needs to send a request to the application platform 500 to install software, the application platform 500 informs the user of the terminal 600 of whether an advertisement is embedded in an application, to prompt the user whether to continue with installation. When the user of the terminal chooses not to install the application, the application platform 500 may recommend a version of the application in which no advertisement is embedded to the user, so as to facilitate the installation and use by the user.

FIG. 13 is an optional schematic structural diagram of the server such as the advertisement characteristic library 400, the detection server 300, and the collection server 200. The server includes a processor 410, an input/output interface 430 (for example, one or more of a display, a keyboard, a touchscreen, a speaker, and a microphone), a storage medium 440, and a network interface 420 (various forms of interfaces supporting network protocols to perform communication, for example, an Ethernet interface). The components may be connected through a system bus 450 to perform communication.

The storage medium 440 may be a read-only memory (ROM), a flash memory, a transfer apparatus, a magnetic storage medium (for example, a magnetic tape, or a magnetic disk drive), an optical storage medium (for example, an optical disc, a hard disk, a paper card, a paper tape), among other known types of program memories. The storage medium stores an executable program. When being executed, the executable program causes the processor 410 in the server to perform the following operations: extracting a characteristic of each advertisement sample in a sample set; determining different types of advertisements carried in an advertisement sample matching the characteristic, and determining characteristic values of the characteristic that correspond to the different types of advertisements, each of the characteristic values representing a probability that the characteristic is an advertisement characteristic of a corresponding type of advertisement; filtering, based on characteristic values of characteristic that correspond to the different types of advertisements, the extracted characteristics to obtain advertisement characteristics of the different types of advertisements; and matching the advertisement characteristics of the different types of advertisements against characteristics extracted from a to-be-detected sample, and determining, when a match is found, that the to-be-detected sample carries an advertisement, and carries an advertisement of a type corresponding to a matching advertisement characteristic.

In an implementation, when being executed, the executable program further causes the processor 410 in the server to perform the following operations: determining the different types of advertisements carried in an advertisement sample matching the characteristic; and determining, for each type of advertisement, a quantity of advertisement samples that match the characteristic and carry the corresponding type of advertisement, and determining, based on the quantity, a characteristic value of the characteristic corresponding to the corresponding type of advertisement.

In an implementation, the sample set further includes a non-advertisement sample. When being executed, the executable program further causes the processor 410 in the server to perform the following operations: determining the quantity of advertisement samples that match the characteristic and carry the corresponding type of advertisement as the characteristic value of the characteristic corresponding to the corresponding type of advertisement; or, determining, based on a quantity of non-advertisement samples in the sample set that match the characteristic, and the quantity of advertisement samples that match the characteristic and carry the corresponding type of advertisement, the characteristic value of the characteristic corresponding to the corresponding type of advertisement.

In an implementation, when being executed, the executable program further causes the processor 410 in the server to perform the following operations: calculating a ratio of the quantity of advertisement samples that match the characteristic and carry the corresponding type of advertisement to the quantity of non-advertisement samples matching the characteristic, to obtain the characteristic value of the characteristic corresponding to the corresponding type of advertisement; or, calculating a ratio of the quantity of advertisement samples that match the characteristic and carry the corresponding type of advertisement to a sum, to obtain the characteristic value of the characteristic corresponding to the corresponding type of advertisement, the sum being a sum of the quantity of non-advertisement samples matching the characteristic and the quantity of advertisement samples that match the characteristic and carry the corresponding type of advertisement.

In an implementation, when being executed, the executable program further causes the processor 410 in the server to perform the following operation: determining, for each type of advertisement, that a characteristic of a only matching advertisement sample carrying the corresponding type of advertisement is an advertisement characteristic of the corresponding type of advertisement. When an only matching advertisement sample comprising the corresponding type of advertisement has a plurality of characteristics, a characteristic having the largest characteristic value is selected as an advertisement characteristic of the corresponding type of advertisement.

In an implementation, when being executed, the executable program further causes the processor 410 in the server to perform the following operations: determining, for each characteristic, when the characteristic matches an advertisement sample carrying a plurality of types of advertisements, an advertisement of a corresponding type when the characteristic has a maximum characteristic value, and determining the characteristic as a characteristic value of the corresponding type of advertisement.

In an implementation, when being executed, the executable program further causes the processor 410 in the server to perform the following operations: selecting, based on the characteristic values of the characteristic that correspond to the different types of advertisements, a characteristic whose characteristic value exceeds a characteristic value threshold as an advertisement characteristic of a corresponding type of advertisement.

In an implementation, when being executed, the executable program further causes the processor 410 in the server to perform the following operations: filtering out, before the determining characteristic values of the characteristic that correspond to the different types of advertisements, a characteristic corresponding to third-party plug-in code from the extracted characteristics, where the third-party plug-in code includes a payment plug-in and an account login software development kit; and updating the sample set by using the to-be-detected sample, and determining, based on the updated sample set, the advertisement characteristics of the different types of advertisements again.

In conclusion, the embodiments of the present disclosure have the following beneficial effects:

Characteristics are automatically extracted (including an advertisement characteristic and a non-advertisement characteristic) and the characteristics are further filtered based on characteristic values of the characteristics to obtain an advertisement characteristic. The entire process does not involve the processing of manually extracting an advertisement characteristic. In this way, after an advertisement sample having a new advertisement is added to a sample set, an advertisement characteristic corresponding to the new advertisement can be automatically determined, so as to achieve a technical effect that advertisement characteristics can be efficiently updated, so that a to-be-detected sample including a new advertisement can be accurately detected based on automatic and rapid update of advertisement characteristics.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a random access memory (RAM), a ROM, a magnetic disk, or an optical disk.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the related technology may be implemented in a form of a software product. The computer software product is stored in the storage medium and includes several instructions for instructing a computer device (which may be a personal computer, a server, a network device, or the like) to perform all or some of the methods described in the embodiments of the present disclosure. The storage medium includes: any media that can store program code, such as a removable storage device, a RAM, a ROM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. An advertisement detection method, comprising:
  extracting a plurality of characteristics from a sample set, including extracting a respective characteristic of each advertisement sample in the sample set by parsing a binary code of the advertisement sample to obtain a characteristic of each function's dimension in the binary code of the advertisement sample, wherein the plurality of characteristics comprises an advertisement characteristic and a non-advertisement characteristic, the plurality of characteristics is extracted without manual extraction;
  for each characteristic of the extracted plurality of characteristics:
    determining different types of advertisements carried in advertisement samples in the sample set matching the characteristic, and
    determining characteristic values of the characteristic that correspond to the different types of advertisements, each of the characteristic values representing a probability that the characteristic is an advertisement characteristic of a corresponding type of advertisements, including:
      determining, for each type of advertisements, a quantity of advertisement samples in the sample set that match the characteristic and carry the corresponding type of advertisements, and determining, based on the quantity, a characteristic value of the characteristic corresponding to the corresponding type of advertisement; and
  filtering, based on characteristic values of the characteristic that correspond to the different types of advertisements, the extracted plurality of characteristics to obtain respective advertisement characteristics of the different types of advertisements;
  matching the advertisement characteristics of the different types of advertisements against characteristics extracted from a to-be-detected sample identified in an installation request from a mobile terminal;
  determining, when a match is found based on the matching, that the to-be-detected sample carries an advertisement, and carries an advertisement of a type corresponding to a matching advertisement characteristic, and
  returning to the mobile terminal requesting the installation of the to-be-detected sample a notification that an advertisement is embedded in the to-be-detected sample, wherein the filtering, based on the characteristic values of the characteristic that correspond to the different types of advertisements, the extracted plurality of characteristics to obtain the respective advertisement characteristics of the different types of advertisements comprises:

for each characteristic, when the characteristic matches an advertisement sample carrying a plurality of types of advertisements, based on the advertisement characteristics of each of the plurality of types of advertisements, choosing an advertisement characteristic of a type of advertisements having a maximum characteristic value as the characteristic value of the characteristic.

2. The method according to claim 1, wherein the sample set further comprises at least one non-advertisement sample that does not carry an advertisement; and the determining, based on the quantity, a characteristic value of the characteristic corresponding to the corresponding type of advertisement comprises:

determining, based on a quantity of non-advertisement samples in the sample set that match the characteristic, and the quantity of advertisement samples that match the characteristic and carry the corresponding type of advertisement, the characteristic value of the characteristic corresponding to the corresponding type of advertisement.

3. The method according to claim 2, wherein the determining, based on the quantity of non-advertisement samples in the sample set that match the characteristic, and the quantity of advertisement samples that match the characteristic and carry the corresponding type of advertisement, the characteristic value of the characteristic corresponding to the corresponding type of advertisement comprises:

calculating a ratio of the quantity of advertisement samples that match the characteristic and carry the corresponding type of advertisement to a sum, to obtain the characteristic value of the characteristic corresponding to the corresponding type of advertisement, the sum being a sum of the quantity of non-advertisement samples matching the characteristic and the quantity of advertisement samples that match the characteristic and carry the corresponding type of advertisement.

4. The method according to claim 1, wherein the filtering, based on the characteristic values of the characteristic that correspond to the different types of advertisements, the extracted plurality of characteristics to obtain the respective advertisement characteristics of the different types of advertisements carried in the advertisement samples comprises:

determining, for each type of advertisements, that a characteristic of an only matching advertisement sample carrying the corresponding type of advertisement is an advertisement characteristic of the corresponding type of advertisement.

5. The method according to claim 1, wherein the filtering, based on the characteristic values of the characteristic that correspond to the different types of advertisements, the extracted plurality of characteristics to obtain the respective advertisement characteristics of the different types of advertisements comprises:

selecting, based on the characteristic values of the characteristic that correspond to the different types of advertisements, a characteristic whose characteristic value exceeds a characteristic value threshold as an advertisement characteristic of a corresponding type of advertisement.

6. The method according to claim 1, further comprising: filtering out, before the determining the characteristic values of the characteristic that correspond to the different types of advertisements, a characteristic corresponding to third-party plug-in code from the extracted plurality of characteristics, wherein the third-party plug-in code comprises: a payment plug-in and an account login software development kit; and the method further comprises:

updating the sample set by using the to-be-detected sample, and determining, based on the updated sample set, the advertisement characteristics of the different types of advertisements again.

7. A computing device, comprising:
one or more processors;
memory;
a display; and
a plurality of instructions stored in the memory that, when executed by the one or more processors, cause the one or more processors to perform the following operations:

extracting a plurality of characteristics from a sample set, including extracting a respective characteristic of each advertisement sample in the sample set by parsing a binary code of the advertisement sample to obtain a characteristic of each function's dimension in the binary code of the advertisement sample, wherein the plurality of characteristics comprises an advertisement characteristic and a non-advertisement characteristic, the plurality of characteristics is extracted without manual extraction;

for each characteristic of the extracted plurality of characteristics:

determining different types of advertisements carried in advertisement samples in the sample set matching the characteristic, and determining characteristic values of the characteristic that correspond to the different types of advertisements, each of the characteristic values representing a probability that the characteristic is an advertisement characteristic of a corresponding type of advertisements, including:

determining, for each type of advertisements, a quantity of advertisement samples in the sample set that match the characteristic and carry the corresponding type of advertisements, and determining, based on the quantity, a characteristic value of the characteristic corresponding to the corresponding type of advertisement;

filtering, based on characteristic values of the characteristic that correspond to the different types of advertisements, the extracted plurality of characteristics to obtain respective advertisement characteristics of the different types of advertisements;

matching the advertisement characteristics of the different types of advertisements against characteristics extracted from a to-be-detected sample identified in an installation request from a mobile terminal;

determining, when a match is found based on the matching, that the to-be-detected sample carries an advertisement, and carries an advertisement of a type corresponding to a matching advertisement characteristic, and returning to the mobile terminal requesting the installation of the to-be-detected sample a notification that an advertisement is embedded in the to-be-detected sample, wherein the filtering, based on the characteristic values of the characteristic that correspond to the different types of advertisements, the extracted plurality of characteristics to obtain the respective advertisement characteristics of the different types of advertisements comprises:

for each characteristic, when the characteristic matches an advertisement sample carrying a plurality of types of advertisements, based on the advertisement characteristics of each of the plurality of types of advertisements, choosing an advertisement characteristic of a type of advertisements having a maximum characteristic value as the characteristic value of the characteristic.

8. The computing device according to claim 7, wherein the sample set further comprises at least one non-advertisement sample that does not carry an advertisement; and the determining, based on the quantity, a characteristic value of the characteristic corresponding to the corresponding type of advertisement comprises:

determining, based on a quantity of non-advertisement samples in the sample set that match the characteristic, and the quantity of advertisement samples that match the characteristic and carry the corresponding type of advertisement, the characteristic value of the characteristic corresponding to the corresponding type of advertisement.

9. The computing device according to claim 8, wherein the determining, based on the quantity of non-advertisement samples in the sample set that match the characteristic, and the quantity of advertisement samples that match the characteristic and carry the corresponding type of advertisement, the characteristic value of the characteristic corresponding to the corresponding type of advertisement comprises:

calculating a ratio of the quantity of advertisement samples that match the characteristic and carry the corresponding type of advertisement to a sum, to obtain the characteristic value of the characteristic corresponding to the corresponding type of advertisement, the sum being a sum of the quantity of non-advertisement samples matching the characteristic and the quantity of advertisement samples that match the characteristic and carry the corresponding type of advertisement.

10. The computing device according to claim 7, wherein the filtering, based on the characteristic values of the characteristic that correspond to the different types of advertisements, the extracted plurality of characteristics to obtain the respective advertisement characteristics of the different types of advertisements carried in the advertisement samples comprises:

determining, for each type of advertisements, that a characteristic of an only matching advertisement sample carrying the corresponding type of advertisement is an advertisement characteristic of the corresponding type of advertisement.

11. The computing device according to claim 7, wherein the filtering, based on the characteristic values of the characteristic that correspond to the different types of advertisements, the extracted plurality of characteristics to obtain the respective advertisement characteristics of the different types of advertisements comprises:

selecting, based on the characteristic values of the characteristic that correspond to the different types of advertisements, a characteristic whose characteristic value exceeds a characteristic value threshold as an advertisement characteristic of a corresponding type of advertisement.

12. The computing device according to claim 7, wherein the operations further include:

filtering out, before the determining the characteristic values of the characteristic that correspond to the different types of advertisements, a characteristic corresponding to third-party plug-in code from the extracted plurality of characteristics, wherein the third-party plug-in code comprises: a payment plug-in and an account login software development kit;

updating the sample set by using the to-be-detected sample, and determining, based on the updated sample set, the advertisement characteristics of the different types of advertisements again.

13. A non-transitory computer-readable storage medium storing a plurality of instructions configured for execution by a computing device having one or more processors and a display, wherein the plurality of instructions cause the computing device to perform the following operations:

extracting a plurality of characteristics from a sample set, including extracting a respective characteristic of each advertisement sample in the sample set by parsing a binary code of the advertisement sample to obtain a characteristic of each function's dimension in the binary code of the advertisement sample, wherein the plurality of characteristics comprises an advertisement characteristic and a non-advertisement characteristic, the plurality of characteristics is extracted without manual extraction;

for each characteristic of the extracted plurality of characteristics:

determining different types of advertisements carried in advertisement samples in the sample set matching the characteristic, and determining characteristic values of the characteristic that correspond to the different types of advertisements, each of the characteristic values representing a probability that the characteristic is an advertisement characteristic of a corresponding type of advertisements, including:

determining, for each type of advertisements, a quantity of advertisement samples in the sample set that match the characteristic and carry the corresponding type of advertisements, and determining, based on the quantity, a characteristic value of the characteristic corresponding to the corresponding type of advertisement; and filtering, based on characteristic values of the characteristic that correspond to the different types of advertisements, the extracted plurality of characteristics to obtain respective advertisement characteristics of the different types of advertisements;

matching the advertisement characteristics of the different types of advertisements against characteristics extracted from a to-be-detected sample identified in an installation request from a mobile terminal;

determining, when a match is found based on the matching, that the to-be-detected sample carries an advertisement, and carries an advertisement of a type corresponding to a matching advertisement characteristic, and returning to the mobile terminal requesting the installation of the to-be-detected sample a notification that an advertisement is embedded in the to-be-detected sample, wherein the filtering, based on the characteristic values of the characteristic that correspond to the different types of advertisements, the extracted plurality of characteristics to obtain the respective advertisement characteristics of the different types of advertisements comprises:

for each characteristic, when the characteristic matches an advertisement sample carrying a plurality of types of advertisements, based on the advertisement characteristics of each of the plurality of types of advertisements, choosing an advertisement characteristic of a type of advertisements having a maximum characteristic value as the characteristic value of the characteristic.

14. The non-transitory computer-readable storage medium according to claim 13, wherein the sample set further comprises at least one non-advertisement sample that does not carry an advertisement; and the determining, based on the quantity, a characteristic value of the characteristic corresponding to the corresponding type of advertisement comprises:
determining, based on a quantity of non-advertisement samples in the sample set that match the characteristic, and the quantity of advertisement samples that match the characteristic and carry the corresponding type of advertisement, the characteristic value of the characteristic corresponding to the corresponding type of advertisement.

15. The non-transitory computer-readable storage medium according to claim 14, wherein the determining, based on the quantity of non-advertisement samples in the sample set that match the characteristic, and the quantity of advertisement samples that match the characteristic and carry the corresponding type of advertisement, the characteristic value of the characteristic corresponding to the corresponding type of advertisement comprises:
calculating a ratio of the quantity of advertisement samples that match the characteristic and carry the corresponding type of advertisement to a sum, to obtain the characteristic value of the characteristic corresponding to the corresponding type of advertisement, the sum being a sum of the quantity of non-advertisement samples matching the characteristic and the quantity of advertisement samples that match the characteristic and carry the corresponding type of advertisement.

16. The non-transitory computer-readable storage medium according to claim 13, wherein the filtering, based on the characteristic values of the characteristic that correspond to the different types of advertisements, the extracted plurality of characteristics to obtain the respective advertisement characteristics of the different types of advertisements carried in the advertisement samples comprises:
determining, for each type of advertisements, that a characteristic of an only matching advertisement sample carrying the corresponding type of advertisement is an advertisement characteristic of the corresponding type of advertisement.

17. The non-transitory computer-readable storage medium according to claim 13, wherein the filtering, based on the characteristic values of the characteristic that correspond to the different types of advertisements, the extracted plurality of characteristics to obtain the respective advertisement characteristics of the different types of advertisements comprises:
selecting, based on the characteristic values of the characteristic that correspond to the different types of advertisements, a characteristic whose characteristic value exceeds a characteristic value threshold as an advertisement characteristic of a corresponding type of advertisement.

\* \* \* \* \*